(12) United States Patent
Shotey et al.

(10) Patent No.: US 7,989,699 B1
(45) Date of Patent: Aug. 2, 2011

(54) ELECTRICAL DEVICE MOUNTING BOXES

(75) Inventors: Marcus J. Shotey, Scottsdale, AZ (US); Jeffrey P. Baldwin, Phoenix, AZ (US); Gabor Budahazi, Scottsdale, AZ (US); Richard L. Cleghorn, Tempe, AZ (US)

(73) Assignee: Taymac Corporation, Gilbert, AZ (US)

( * ) Notice: Subject to any disclaimer, the term of this patent is extended or adjusted under 35 U.S.C. 154(b) by 483 days.

(21) Appl. No.: 12/337,497

(22) Filed: Dec. 17, 2008

Related U.S. Application Data

(60) Provisional application No. 61/114,415, filed on Nov. 13, 2008, provisional application No. 61/097,179, filed on Sep. 15, 2008, provisional application No. 61/034,561, filed on Mar. 7, 2008.

(51) Int. Cl.
*H01H 9/02* (2006.01)

(52) U.S. Cl. .............. 174/53; 174/50; 174/58; 439/535; 33/528

(58) Field of Classification Search .............. 174/50, 174/58, 53, 66, 67, 520; 439/535; 220/3.8, 220/241, 242; 33/528
See application file for complete search history.

(56) References Cited

U.S. PATENT DOCUMENTS

| | | | |
|---|---|---|---|
| 2,775,812 A | 1/1957 | Mohr | |
| 5,432,298 A | 7/1995 | Thompson | |
| 6,103,974 A | 8/2000 | Erdfarb | |
| 6,166,329 A * | 12/2000 | Oliver et al. | 174/58 |
| 6,403,883 B1 * | 6/2002 | Morgan et al. | 174/58 |
| 6,492,589 B1 * | 12/2002 | Smith | 174/50 |
| 6,583,359 B1 * | 6/2003 | Cabello-Colon | 174/66 |
| 6,686,540 B2 | 2/2004 | Compagnone, Jr. | |
| 6,803,522 B2 | 10/2004 | Skakun | |
| 7,075,008 B2 | 7/2006 | Smith | |
| 7,432,444 B1 | 10/2008 | McCusker | |
| 7,457,687 B1 * | 11/2008 | Porter | 700/284 |
| 7,718,890 B1 * | 5/2010 | Lemke | 174/50 |

* cited by examiner

*Primary Examiner* — Dhirubhai R Patel

(74) *Attorney, Agent, or Firm* — Booth Udall, PLC

(57) ABSTRACT

An electrical device mounting box assembly includes an electrical device mounting box and a removable mud cover coupled to the electrical device mounting box via at least one living hinge. The living hinge may be severed by fatiguing the living hinge or by mechanical severance. The removable mud cover may includes a latch to maintain the removable mud cover in a closed position. A rear face of the removable mud cover, which faces a front opening of the electrical device mounting box when the removable mud cover is in a closed position, may includes a cavity configured to receive a face of an electrical device mounted in the electrical device mounting box when the removable mud cover is in a closed position. The removable mud cover may includes a narrow imprinter configured to imprint drywall when drywall is pressed against the narrow imprinter.

22 Claims, 14 Drawing Sheets

ELECTRICAL DEVICE MOUNTING BOXES

CROSS REFERENCE TO RELATED APPLICATIONS

This document claims the benefit of the filing dates of U.S. Provisional Patent Application Ser. Nos. 61/114,415 to Shotey, et al., entitled "Box with Integral Mud Cover and Marking Points," filed Nov. 13, 2008; 61/097,179 to Shotey, et al. entitled "Electrical Outlet Box with a Hinged Mud Cover," filed on Sep. 15, 2008; and 61/034,561 to Shotey et al. entitled "Electrical Outlet Box with a Hinged Mud Cover," filed on Mar. 7, 2008, the disclosures of each of which are hereby incorporated herein by reference.

BACKGROUND

1. Technical Field

Aspects of this document relate generally to electrical device in-wall mounting boxes and box assemblies.

2. Background Art

Electrical device mounting boxes, such as electrical outlet mounting boxes, are typically installed in a wall before drywall and/or other finishing surfaces of a wall are put in place. As a result, the electrical outlet box may become cluttered with debris, drywall, stucco, plaster, joint compound, wall texture compound, and so forth (collectively "mud") while the wall is being finished. When the wall is completed, the electrical outlet box is conventionally cleaned (sometimes with a saw or knife) to remove the materials that have ended up in the box prior to use. It is known in the art to place a plug, such as that shown and described in U.S. Pat. No. 7,075,078 to Smith, issued Jul. 11, 2006, in the opening of the electrical box prior to finishing the wall.

SUMMARY

Aspects of this document relate to electrical outlet boxes.

In one aspect, an electrical device mounting box assembly comprises: an electrical device mounting box configured for mounting within a wall such that a front opening of the electrical device mounting box extends into a planar covering on the wall; and a removable mud cover coupled to the electrical device mounting box by at least one living hinge on at least one side of the front opening; wherein the removable mud cover is selectively moveable between an open position in which the front opening of the electrical device mounting box is open and a closed position in which the front opening of the electrical device mounting box is covered by the removable mud cover; and wherein the removable mud cover when moved to its closed position is configured to remain in its closed position through a latch.

Particular implementations may include one or more of the following.

The at least one living hinge may comprise a plurality of living hinges on the at least one side of the front opening. The plurality of living hinges may all be on one side of the front opening. The at least one living hinge may be configured to undergo fatigue failure at less than 30 cycles. The latch may comprise one of a ridge and a bulge on at least one side of the removable mud cover and one of a ridge and a bulge on a corresponding inner wall surface of the electrical device mounting box. The removable mud cover may comprise a front side and a rear side, the rear side facing the front opening of the electrical device mounting box when the removable mud cover is in its closed position, the rear side comprising a cavity sized to receive a face of an electrical device mounted in the electrical device mounting box when the removable mud cover is in its closed position. The removable mud cover may further comprise a narrow imprinter extending outward from a front face of the removable mud cover, the narrow imprinter configured to form an impression on drywall when drywall is pressed against the narrow imprinter. The latch may comprise a first latch member on an outer side of the electrical device mounting box and a second latch member on a corresponding side of the removable mud cover, the first and second latch members being configured to latch together upon closure of the removable mud cover. The removable mud cover may further be configured such that in a closed position it abuts against a front edge of the front opening of the electrical device mounting box but does not substantially touch an inner wall surface of the electrical device mounting box and does not substantially touch an outer wall surface of the electrical device mounting box.

In another aspect, an electrical device mounting box assembly comprises: an electrical device mounting box configured for mounting within a wall such that a front opening of the electrical device mounting box extends into a planar covering on the wall; and a removable mud cover selectively closeable upon an open side of the electrical device mounting box; the removable mud cover comprising at least one narrow imprinter extending outward from a front face of the removable mud cover, the narrow imprinter configured to form an impression on drywall when drywall is pressed against the narrow imprinter.

Particular implementations may include one or more of the following.

The removable mud cover may be coupled to the electrical device mounting box by a plurality of living hinges on at least one side of the front opening; wherein the removable mud cover is selectively moveable between an open position in which the front opening of the electrical device mounting box is open and a closed position in which the front opening of the electrical device mounting box is covered by the removable mud cover; and wherein the removable mud cover when moved to its closed position is configured to remain in its closed position through a latch. The plurality of living hinges may be configured to undergo fatigue failure at less than 30 cycles. The latch may comprise one of a ridge and a bulge on at least one side of the removable mud cover and one of a ridge and a bulge on a corresponding inner wall surface of the electrical device mounting box. The removable mud cover may comprise a front side and a rear side, the rear side facing the front opening of the electrical device mounting box when the removable mud cover is in its closed position, the rear side comprising a cavity sized to receive a face of an electrical device mounted in the electrical device mounting box when the removable mud cover is in its closed position. The latch may comprise a first latch member on an outer side of the electrical device mounting box and a second latch member on a corresponding side of the removable mud cover, the first and second latch members being configured to latch together upon closure of the removable mud cover. The removable mud cover may further be configured such that in a closed position it abuts against a front edge of the front opening of the electrical device mounting box but does not substantially touch an inner wall surface of the electrical device mounting box and does not substantially touch an outer wall surface of the electrical device mounting box. The at least one narrow imprinter may comprise a plurality of narrow imprinters substantially located at the corners of the removable mud cover and extending substantially perpendicularly outward from the removable mud cover.

In another aspect, an electrical device mounting box assembly comprises: an electrical device mounting box configured for mounting within a wall such that a front opening of the electrical device mounting box extends into a planar covering on the wall; an attachment panel comprising a through-hole, the attachment panel configured to couple to the electrical device mounting box and an electrical device by being sandwiched between electrical device mounting box and the electrical device; and a removable mud cover coupled to the attachment member by at least one living hinge on at least one side of the attachment member; wherein the removable mud cover is selectively moveable between an open position in which the front opening of the electrical device mounting box is open and accessible through the through-hole and a closed position in which the front opening of the electrical device mounting box is covered by the removable mud cover.

Particular implementations may include one or more of the following:

The removable mud cover when moved to its closed position may be configured to remain in its closed position through a latch. The at least one living hinge may comprise a plurality of living hinges on the at least one side of the attachment member. The plurality of living hinges may be all on one side of the attachment member. The at least one living hinge may be configured to undergo fatigue failure at less than 30 cycles. The removable mud cover may comprise a front side and a rear side, the rear side facing the front opening of the electrical device mounting box when the removable mud cover is in its closed position, the rear side comprising a cavity sized to receive a face of an electrical device mounted in the electrical device mounting box when the removable mud cover is in its closed position. The removable mud cover may further comprise a narrow imprinter extending outward from a front face of the removable mud cover, the narrow imprinter configured to form an impression on drywall when drywall is pressed against the narrow imprinter.

In another aspect, a method of using an electrical device mounting box assembly comprises: installing an electrical device mounting box within a wall such that a front opening of the electrical device mounting box extends into a planar covering on the wall; coupling a removable mud cover to the electrical device mounting box via at least one living hinge on at least one side of the front opening; closing the removable mud cover from an open position, in which the front opening of the electrical device mounting box is open, to a closed position in which the front opening of the electrical device mounting box is covered by the removable mud cover; selectively maintaining the removable mud cover in the closed position through a latch; and removing the removable mud cover from the electrical device mounting box by breaking the at least one living hinge.

Particular implementations may include one or more of the following.

The step of breaking the at least one living hinge may comprise fatiguing the at least one living hinge in less than 30 cycles. The method may further comprise the steps of installing an electrical device within the electrical device mounting box and receiving a face of the electrical device within a cavity in a rear side of the removable mud cover upon closure of the removable mud cover. The method may further comprise the step of forming an impression on drywall by pressing the drywall against at least one narrow imprinter extending outward from a front face of the removable mud cover. The step of closing the removable mud cover may comprise abutting the removable mud cover against a front edge of the electrical device mounting box without substantially touching the removable mud cover to an inner wall surface of the electrical device mounting box and without substantially touching the removable mud cover to an outer wall surface of the electrical device mounting box.

In another aspect, a method of using an electrical device mounting box assembly comprises: installing an electrical device mounting box within a wall such that a front opening of the electrical device mounting box extends into a planar covering on the wall; coupling a removable mud cover to the electrical device mounting box; closing the removable mud cover from an open position, in which the front opening of the electrical device mounting box is open, to a closed position in which the front opening of the electrical device mounting box is covered by the removable mud cover; selectively maintaining the removable mud cover in the closed position through a latch; and forming an impression on drywall by pressing the drywall against at least one narrow imprinter extending outward from a front face of the removable mud cover.

Particular implementations may include one or more of the following.

The step of coupling the removable mud cover to the electrical device mounting box may comprise removably coupling the removable mud cover to the electrical device mounting box via at least one living hinge on at least one side of the front opening; and the method may further comprise the step of removing the removable mud cover from the electrical device mounting box by breaking the at least one living hinge. The step of breaking the at least one living hinge may comprise fatiguing the at least one living hinge at less than 30 cycles. The method may further comprise the steps of installing an electrical device within the electrical device mounting box and receiving a face of the electrical device within a cavity in a rear side of the removable mud cover upon closure of the removable mud cover. The step of closing the removable mud cover may comprise abutting the removable mud cover against a front edge of the electrical device mounting box without substantially touching the removable mud cover to an inner wall surface of the electrical device mounting box and without substantially touching the removable mud cover to an outer wall surface of the electrical device mounting box.

In another aspect, a method of using an electrical mounting box assembly comprises: installing an electrical device mounting box within a wall such that a front opening of the electrical device mounting box extends into a planar covering on the wall; coupling an attachment panel comprising a through hole to the electrical device mounting box and to an electrical device by sandwiching the attachment panel between the electrical device mounting box and the electrical device; and coupling a removable mud cover to the attachment panel by at least one living hinge on at least one side of the attachment member.

Particular implementations may include one or more of the following.

The method may further comprise the step of forming an impression on drywall by pressing the drywall against at least one narrow imprinter extending outward from a front face of the removable mud cover. The method may further comprise the step of selectively maintaining the removable mud cover in a closed position through a latch. The method may further comprising the step of breaking the at least one living hinge. The step of breaking the at least one living hinge may comprise fatiguing the at least one living hinge at less than 30 cycles. The method may further comprise the step of installing an electrical device within the electrical device mounting box and receiving a face of the electrical device within a cavity in a rear side of the removable mud cover upon closure of the removable mud cover.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

An electrical device mounting box assembly will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical device mounting box assembly and/or methods for using an electrical device mounting box assembly will become apparent for use with implementations of electrical devices from this disclosure. Accordingly, for example, although particular electrical device mounting box assemblies, electrical device mounting boxes, removable mud covers, openings, living hinges, latches, front sides, rear sides, cavities, narrow imprinters, front faces, first latch members, second latch members, front edges, inner wall surfaces, outer wall surfaces, holes, tabs, and electrical devices are disclosed, such implementing components are not limited to those particular embodiments disclosed herein and may comprise any shape, size, style, type, model, version, measurement, concentration, material, quantity, and/or the like as is known in the art for such electrical device mounting box assemblies and implementing components consistent with the intended operation of an electrical device mounting box assembly.

Figure 1:
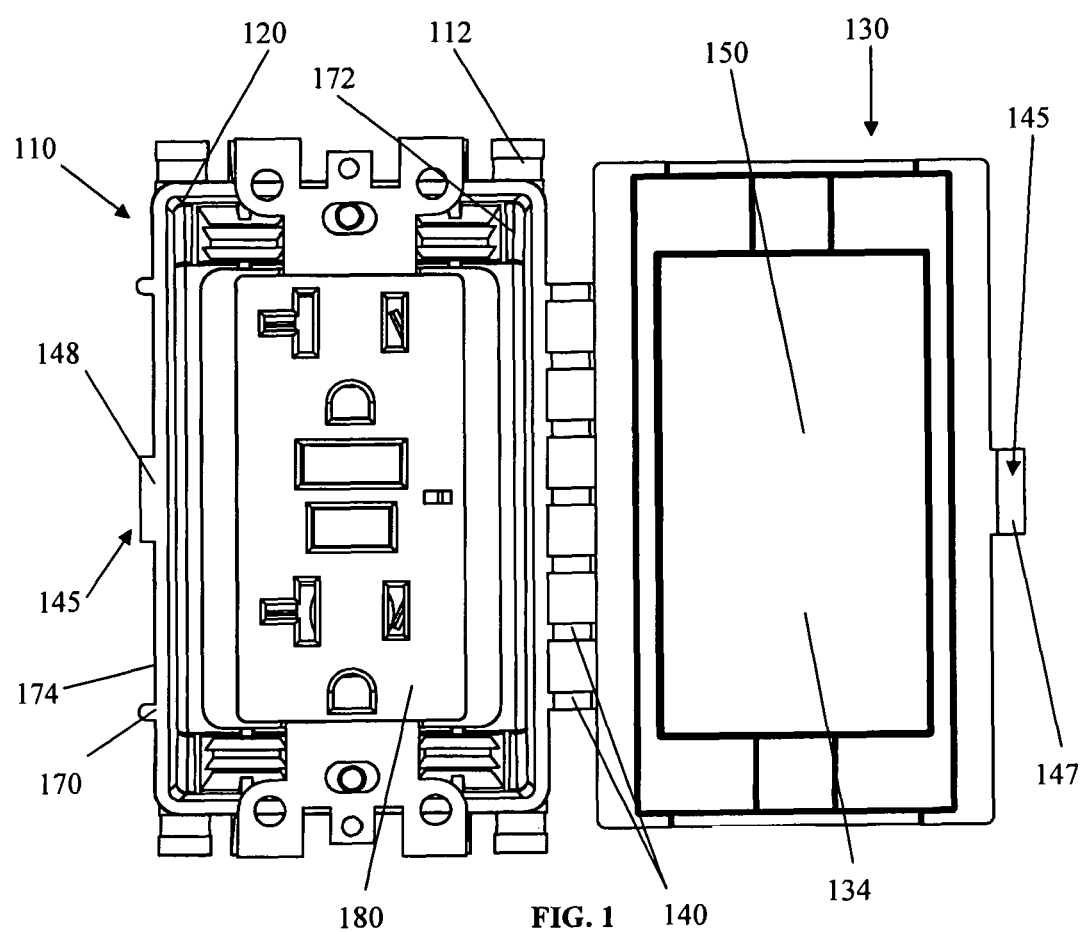
FIG. 1 is a front view of one embodiment of an electrical device mounting box assembly in an open configuration.
Figure 2:
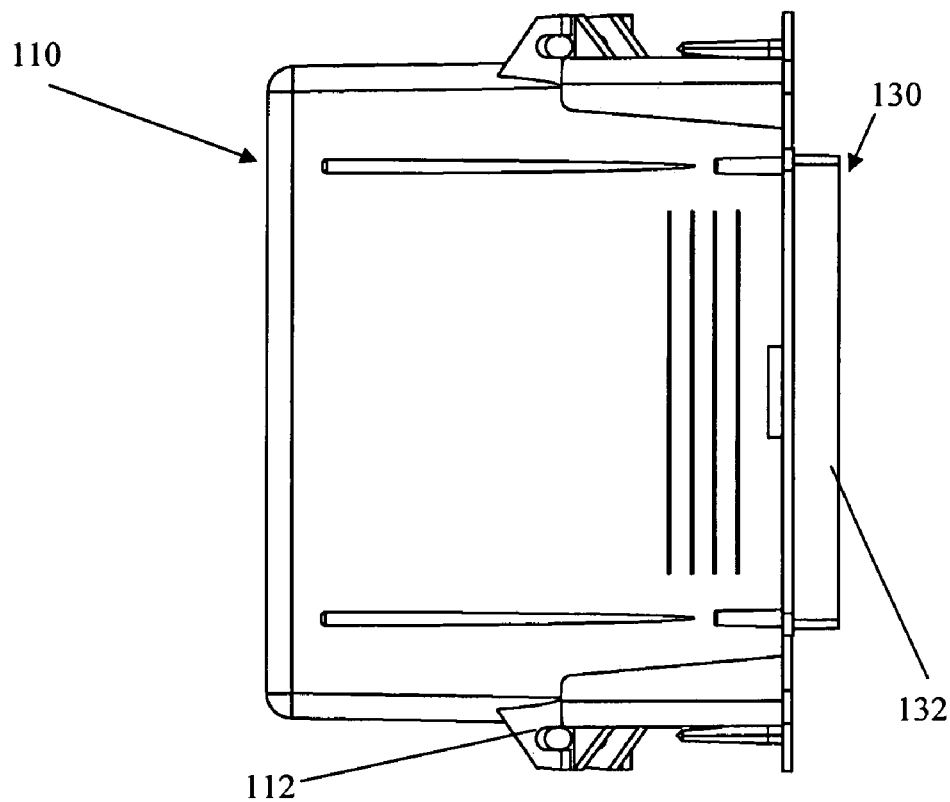
FIG. 2 is a side view of the embodiment of FIG. 1 in a closed configuration.
Figure 3:
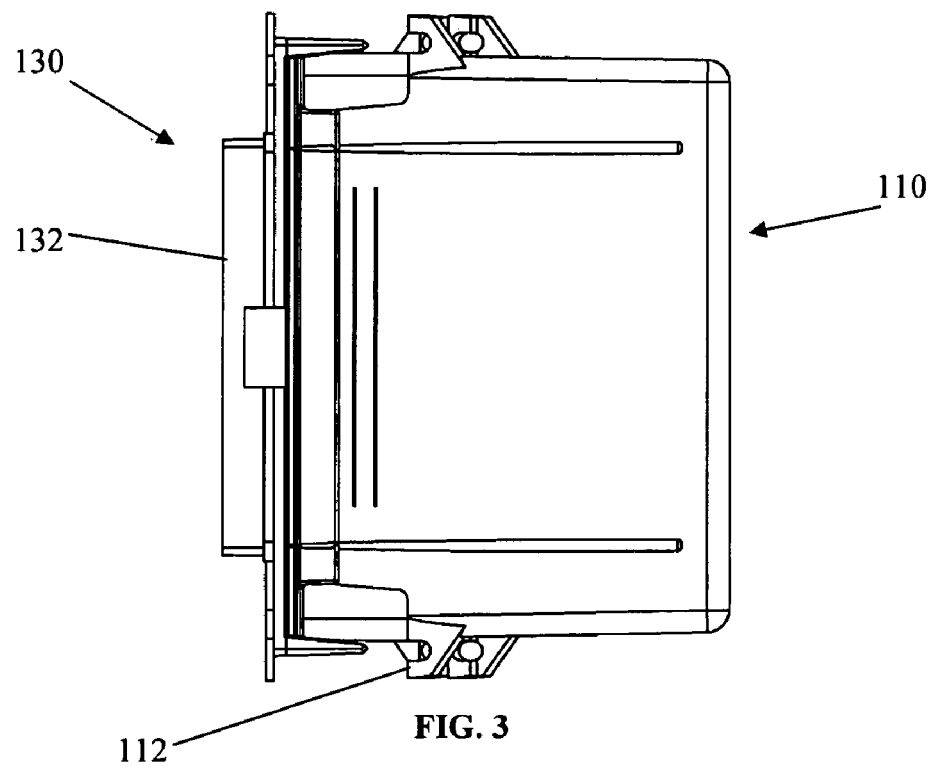
FIG. 3 is a different side view of the embodiment of FIG. 1 in a closed configuration.

There are a variety of implementations of the electrical device mounting box assembly possible from the present disclosure. FIGS. 1-3 illustrate a first particular implementation of an electrical device mounting box assembly. In this implementation the electrical device mounting box assembly comprises an electrical device mounting box 110 configured for mounting within a wall. The electrical device mounting box 110 is configured for mounting within a wall such that a front opening 120 of the electrical device mounting box extends into a planar covering on the wall. The wall may comprise any location where an electrical device mounting box assembly may be located such as, by non-limiting example, a wall in a business, a wall in a house, a roof, a ceiling, a floor, an outcropping or island structure inside or outside a residence or other building, and so forth. The planar covering on the wall may comprise any substantially planar item that at least partially covers the wall. The planar covering may comprise, by non-limiting example, a piece of drywall, a piece of wood, stucco, plaster, a flat panel, and so forth.

The electrical device mounting box assembly of FIGS. 1-3 further comprises a removable mud cover 130 coupled to the electrical device mounting box 110 by at least one living hinge 140 on at least one side of the front opening 120, wherein the removable mud cover 130 is selectively moveable between an open position in which the front opening 120 of the electrical device mounting box 110 is open (as in FIG. 1) and a closed position in which the front opening 120 of the electrical device mounting box 110 is covered by the removable mud cover 130 (as seen in FIGS. 2-3). Although the implementation in FIGS. 1-3 comprises a plurality of living hinges 140, other implementations may comprise a single living hinge 140. The living hinge 140 may be configured to fatigue upon reaching approximately a certain number of cycles of opening and closing the removable mud cover 130. Those of ordinary skill in the art will understand that plastic components may be made more or less brittle, and/or more or less thick by varying the composition of the plastic and/or the plastic mold characteristics so that components may be made to be more or less breakable under predetermined stresses. Although it may be difficult or impossible in some circumstances to exactly determine how many cycles will break each implementation, approximate estimates can be made and this is sufficient for most implementations. For instance, in various implementations the living hinge 140 could be configured to fatigue at approximately 100, 70, 50, 20 or 10 cycles. A cycle being opening and closing of the removable mud cover 130. Alternatively, the living hinge 140 may be configured such that it does not fatigue at these numbers of cycles but fatigues only at a higher number of cycles. In these implementations, or even in easily fatigued implementations, the living hinge 140 could instead be severed by some other method such as by cutting with a knife or other sharp instrument. The removable mud cover 130 comprises a front side 132 and a rear side 134, the rear side 134 facing the front opening 120 of the electrical device mounting box 110 when the removable mud cover 130 is in its closed position.

The living hinges 140 are all located on one side of the front opening 120. In various other implementations the living hinges 140 could be on more than one side of the front opening 120, or located at a corner such that the living hinge 140 is partially or substantially diagonal with respect to the front opening 120. The side of the front opening 120 could comprise, therefore, the left or right side of the front opening 120, the top or bottom of the front opening 120, a corner of the front opening 120, and so forth. The living hinge 140 could be located at one or more of these various locations.

The removable mud cover 130, when moved to its closed position, is configured to remain in its closed position through a latch 145. The latch 145 may comprise any latching mechanism such as, by non-limiting example a friction fit, a locking mechanism, a twisting mechanism, a magnetic element, a screw, and so forth. The latch 145 comprises a first latch element 147 associated with the removable mud cover 130 and a second latch element 148 associated with the electrical device mounting box 110. The first latch element 147 and second latch element 148 are configured to mate with one another upon closure of the removable mud cover 130 in a way that the first latch element 147 is forced into an extended state as it is pushed against the second latch element 148, such that once it is past the second latch element 148 the first latch element 147 relaxes into a non-extended state, thereby abutting against the second latch element 148 and preventing opening of the removable mud cover 130 without user intervention. User intervention may comprise a person manually extending the first latch element 147 so that it may once again pass over the second latch element 148 in the opposite direction or simply swinging the removable mud cover 130 towards an open position with enough force that the first latch element 147 is forced again into the extended state, allowing it to pass over the second latch element 148. Closure of the removable mud cover 130 into a latched state can be accomplished in a similar manner. In the implementation in FIGS. 1-3 the first latch member 147 is located on an outer side of the electrical device mounting box 110 and the second latch member 148 is located on a corresponding side of the removable mud cover 130, the first latch member 147 and second latch member 148 being configured to engage together upon closure of the removable mud cover 130 to frictionally and/or mechanically resist opening of the removable mud cover 130.

In various other implementations, the latch 145 could be configured differently. For instance the latch 145 may comprise one of a ridge and a bulge on at least one side of the removable mud cover 130 and one of a ridge and a bulge on a corresponding inner wall surface 172 of the electrical device mounting box 110. Accordingly, the first latch element 147 could comprise one of a ridge and a bulge and the second latch element 148 could comprise one of a ridge and a bulge.

The removable mud cover 130 in the implementation of FIGS. 1-3 is further configured such that in a closed position it abuts against a front edge 170 of the front opening 120 of the electrical device mounting box 110 but does not substantially touch an inner wall surface 172 of the electrical device mounting box 110 and does not substantially touch an outer wall surface 174 of the electrical device mounting box 110. The removable mud cover 130 comprises a cavity 150 sized to receive a face of an electrical device 180 mounted in the electrical device mounting box 110 when the removable mud cover 130 is in its closed position. The cavity 150 may be any shape, size, and depth. The cavity 150 in the illustrated implementation of FIGS. 1-3 is sized to receive an electrical outlet such as a duplex outlet or a GCFI outlet, however in other implementations the cavity 150 could be sized to receive a switch or other type of electrical device (see, for example, the implementation shown in FIGS. 4 and 5).

The electrical device mounting box 110 comprises mounting elements 112 configured to allow mounting of the electrical device mounting box 110 to a wall. The mounting elements 112 depicted in FIGS. 1-3 comprise elements partially forming hollow cylinders to receive a nail or screw, thereby mounting the electrical device mounting box 110 to a part of a wall through which a nail or screw may be driven through. The mounting elements 112 depicted in FIGS. 1-3 are located on the top and bottom of the electrical device mounting box 110 and are offset at an angle from the front of the electrical device mounting box. The mounting elements could alternatively be located on any other portion of the electrical device mounting box 110 and could be set at any angle. The mounting elements 112 in various other implementations could be something other than elements configured to receive a screw or nail. Many other types of wall mounting elements are known in the art and any variety may be adapted for use with the principles shown and described in this disclosure. By non-limiting example, other mounting elements could be configured to form a friction fit within a wall, to be glued to a wall, to be latched or locked into a wall, and so forth.

The electrical device mounting box assembly of FIGS. 1-3 is configured to receive an electrical device 180. In the implementation in FIGS. 1-3 the electrical device 180 comprises an electrical outlet. The electrical outlet could be any type of electrical outlet such as GFCI, duplex, round, and so forth. The electrical device 180 could alternatively be another device such as a switch.

The closure of the removable mud cover 130 facilitates a clean electrical device mounting box assembly. For instance, closure of the removable mud cover 130 after installing the electrical mounting box assembly in a wall allows a builder to then continue building and preparing a wall while keeping undesired objects from entering and blocking the opening to the electrical device mounting box 110. Thus, when a user has later built up and fully prepared the wall, he can then remove the removable mud cover 130 and continue the installation of the electrical device 180.

Figure 4:
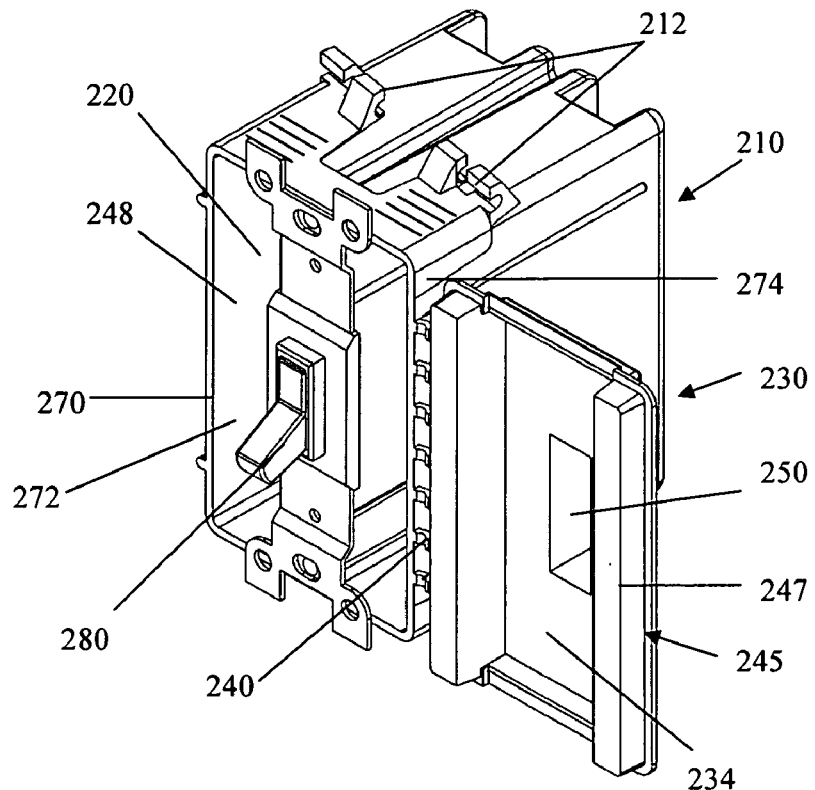
FIG. 4 is a front perspective view of another embodiment of an electrical device mounting box assembly in an open configuration with an electrical device therein.
Figure 5:
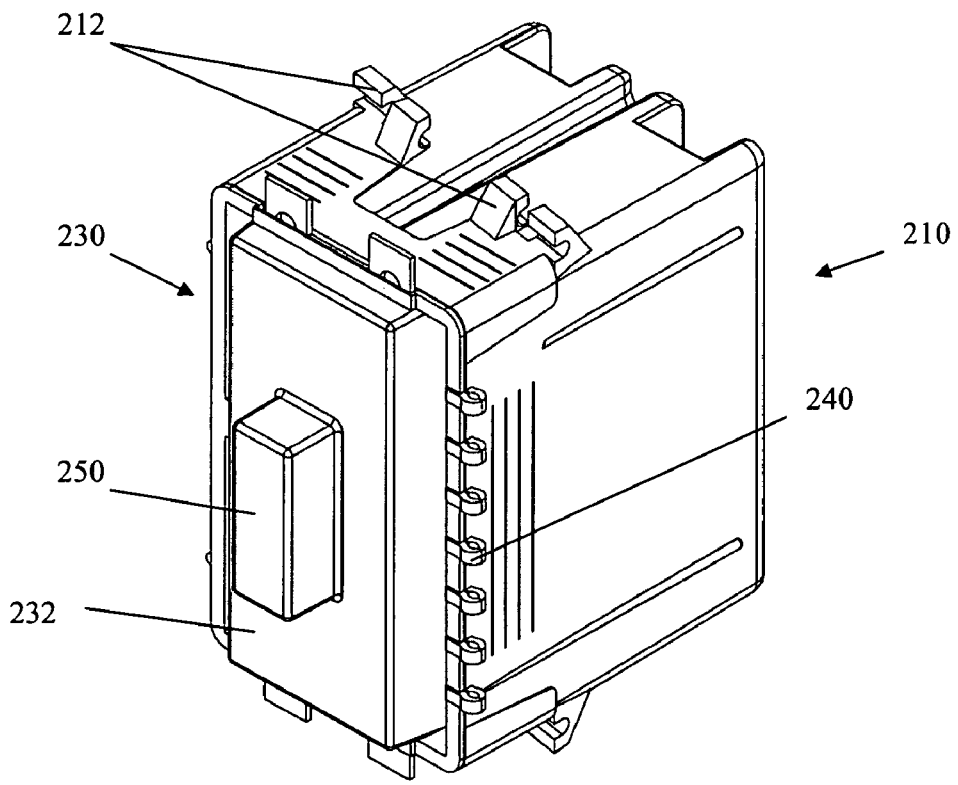
FIG. 5 is a front perspective view of the embodiment if FIG. 4 in a closed configuration.

FIGS. 4-5 illustrate a second particular implementation of an electrical device mounting box assembly. The electrical device mounting box assembly of FIGS. 4-5 has several components that are similar or equivalent to the components of the electrical device mounting box assembly of FIGS. 1-3. For instance, mounting elements 212, electrical device mounting box 210, front opening 220, front edge 270, inner wall surface 272, outer wall surface 274, front side 232 and electrical device 280 can all be explained by reference to their counterparts already described above with respect to the implementation of an electrical device mounting box assembly of FIGS. 1-3. The electrical device mounting box assembly of FIGS. 4-5 is different from the implementation in FIGS. 1-3 in that the rear side 234 of the removable mud cover 230 comprises a cavity 250 sized differently than the cavity 150—the cavity 250 being more particularly configured to receive a face of a switch mounted in the electrical device mounting box 210 when the removable mud cover 230 is in its closed position.

The electrical device mounting box assembly of FIGS. 4-5 is also different from the implementation in FIGS. 1-3 in that the latch 245 is different than the latch 145 depicted in FIGS. 1-3. Latch 245 comprises a first latch member 247 and a second latch member 248. The first latch member 247 comprises a substantially cuboidal ridge on a side of the removable mud cover 230 extending substantially perpendicularly out from the rear side 234 of the removable mud cover 230. The second latch member 248 comprises an inner wall surface 272 of the electrical device mounting box 210. When the removable mud cover 230 is swung to a closed position, the first latch member 247 and second latch member 248 form a friction fit, maintaining the removable mud cover 230 in a closed position. Additional texture, ridges and/or bulges may be added to the first latch member 247 and/or second latch member 248 to assist in forming a friction fit to resist movement of the removable mud cover 230 from its closed position.

The electrical device mounting box assembly of FIGS. 4-5 is also different from the implementation if FIGS. 1-3 in that the removable mud cover 230 is configured such that in a closed position it touches an inner wall surface 272 of the electrical device mounting box 210. The implementation of an electrical device mounting box assembly of FIGS. 4-5 is similar to the implementation of FIGS. 1-3 in that the removable mud cover 230 abuts against a front edge 270 of the front opening 220 of the electrical device mounting box 210 and does not substantially touch an outer wall surface 274 of the electrical device mounting box 210.

Figure 6:
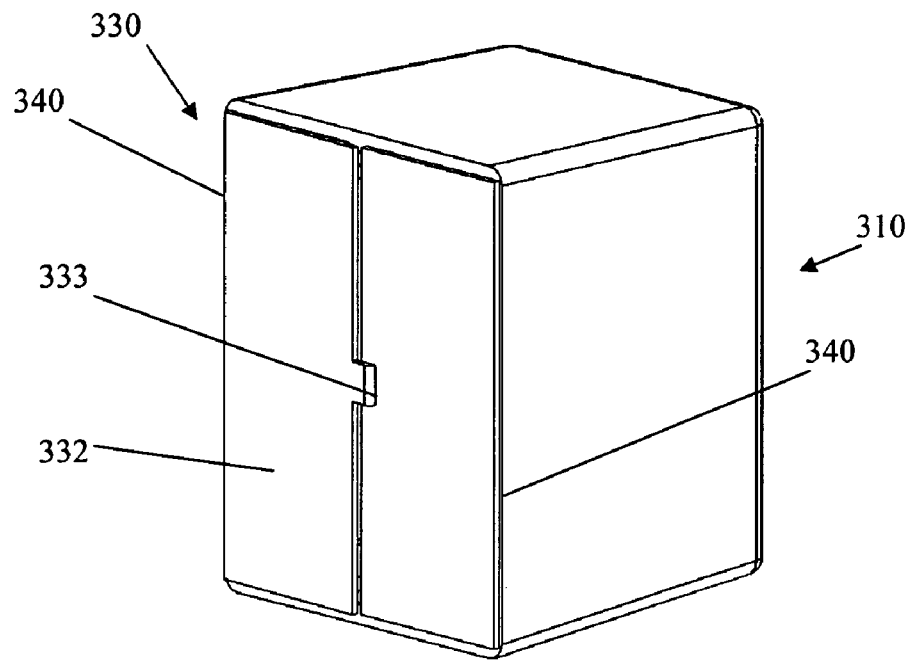
FIG. 6 is a front perspective view of another embodiment of an electrical device mounting box assembly in a closed configuration.

FIG. 6 illustrates a third particular implementation of an electrical device mounting box assembly. This implementation is similar in many regards to the aforementioned implementations and is also different in some regards. One of the differences is that the removable mud cover 330 in this implementation comprises two side pieces, or flaps, which both swing to a closable position in order to close the front opening. Another difference is that each flap or piece of the removable mud cover 330 is coupled to the electrical device mounting box 310 by a single living hinge 340. It can also be seen that a tab 333 is located on front side 332 of one of the flaps of the removable mud cover 330, which can be used to aid in opening the removable mud cover 330 to an open position and to latch the removable mud cover 330 in its closed position.

Figure 7:
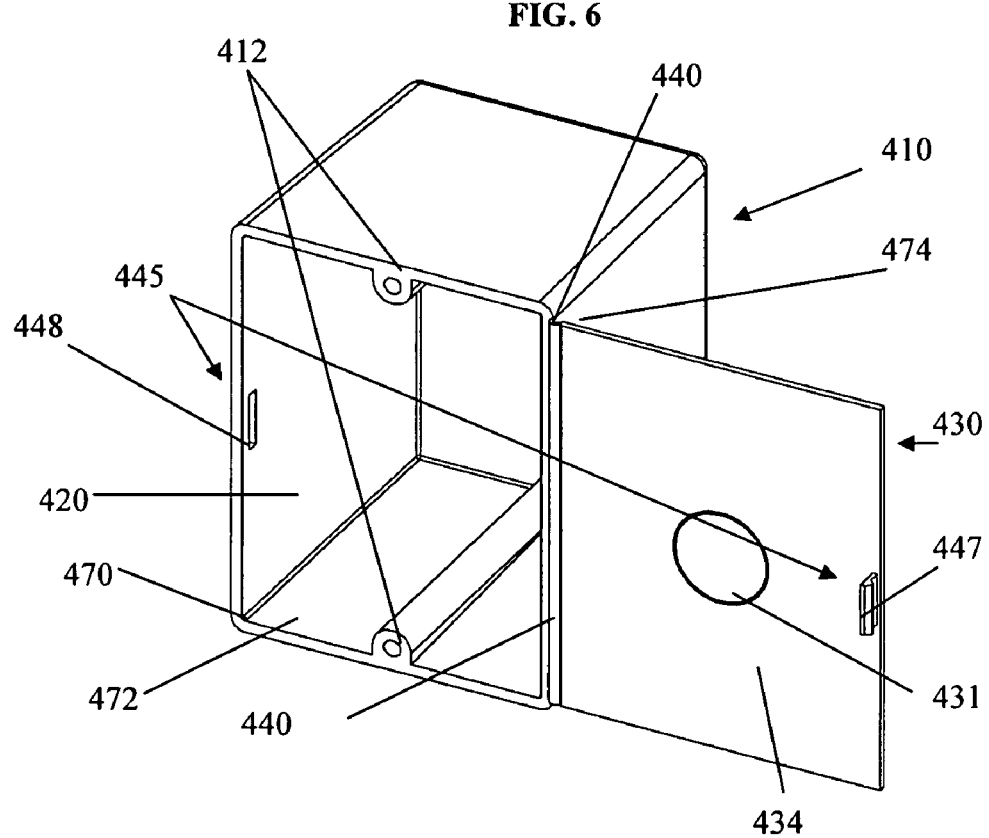
FIG. 7 is a front perspective view of another embodiment of an electrical device mounting box assembly in an open configuration.
Figure 8:
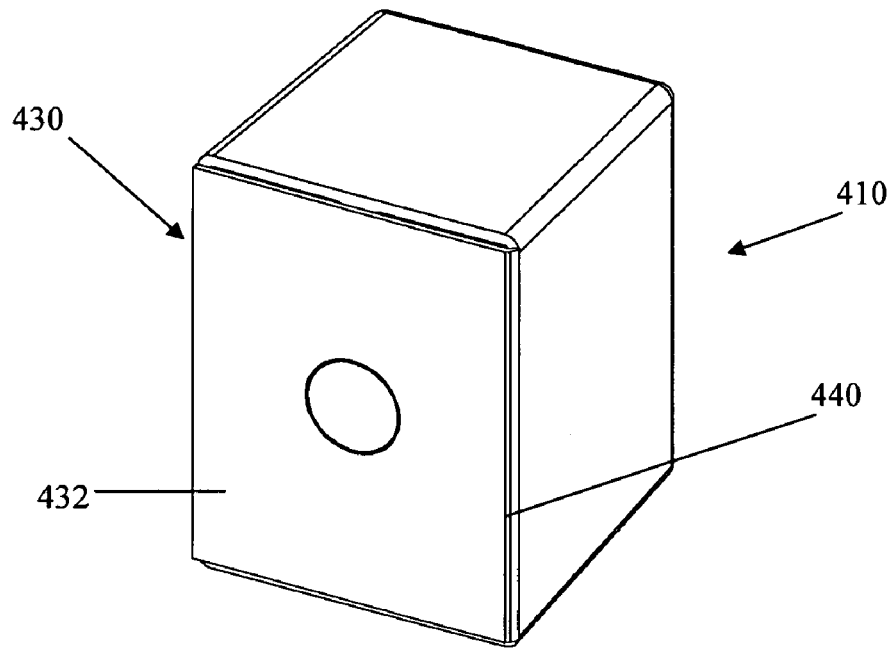
FIG. 8 is a front perspective view of the embodiment of FIG. 7 in a closed configuration.
Figure 9:
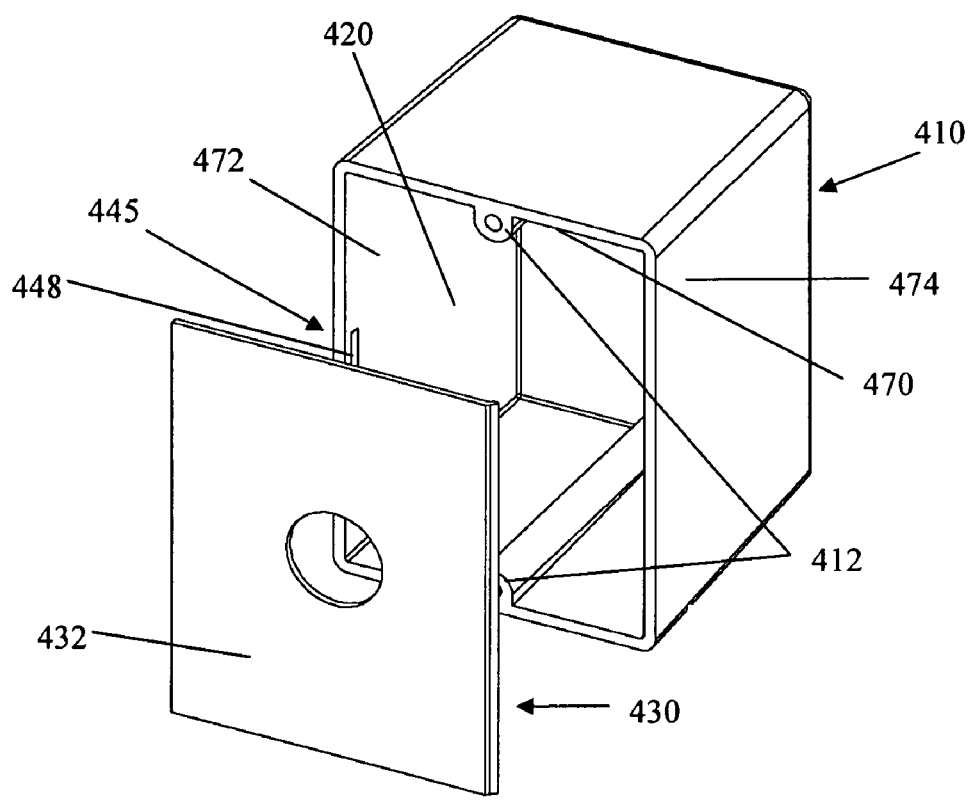
FIG. 9 is a front perspective view of the embodiment of FIG. 7 with the mud cover removed.

FIGS. 7-9 illustrate a fourth particular implementation of an electrical device mounting box assembly. This implementation is similar to the implementation in FIG. 6 in several regards, for instance the removable mud cover 430 is coupled to the electrical device mounting box 410 by a single living hinge 440. The removable mud cover 430, however, comprises a hole 431 which aids a user in opening the removable mud cover 430 from a closed position—the hole 431 being sized to receive a finger of the user and the finger of the user can then be pulled against the rear side 434 of the removable mud cover 430 in order to move the removable mud cover 430 to an open position. While the hole 431 in the illustrated implementation is circular and located in the center of the removable mud cover 430, it could alternatively be any other shape and located in another portion of the removable mud cover 430.

The box mounting apertures 412 are located on the center of the upper and lower inner wall surfaces 472 of the electrical device mounting box 410. As has already been described with respect to other implementations, these box mounting apertures 412 could be in any other location. The removable mud cover 430 in this implementation is configured such that in a closed position it abuts against a front edge 470 of the front opening 420 of the electrical device mounting box 410 but does not substantially touch an inner wall surface 472 of the electrical device mounting box 410 and does not substantially touch an outer wall surface 474 of the electrical device mounting box 410.

The latch 445 of the implementation of FIGS. 7-9 comprises a first latch member 447 located on the rear side 434 of the removable mud cover 430 and a second latch member 448 located on a corresponding inner wall surface 472 of the electronic device mounting box 410. The first latch member 447 comprises a ridge or bulge and the second latch member 448 comprises a ridge or bulge as well, such that when the removable mud cover 430 is placed in the closed position the ridge(s) and/or bulge(s) tend to inhibit opening of the removable mud cover 430 so as to maintain the removable mud cover 430 in a closed position until user intervention opens the removable mud cover 430. Referring to FIG. 8, there is no tab on the front side 432 of the removable mud cover 430 because one is not needed to open the removable mud cover—the hole 431 performing such a function. FIG. 9 illustrates the electrical device mounting box assembly of this implementation with the removable mud cover 430 removed. As already described, the removable mud cover may be removed by fatiguing the living hinge 440, by cutting the living hinge 440, or by some other method, as described with reference to previous implementations disclosed herein.

Figure 10:
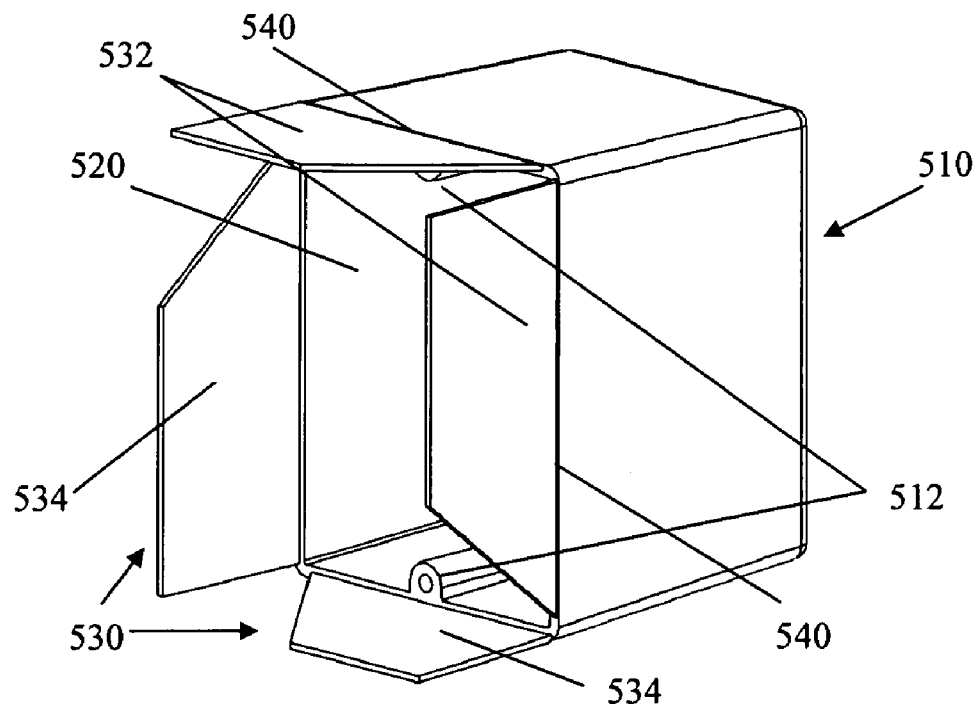
FIG. 10 is a front perspective view of another embodiment of an electrical device mounting box assembly in an open configuration.
Figure 11:
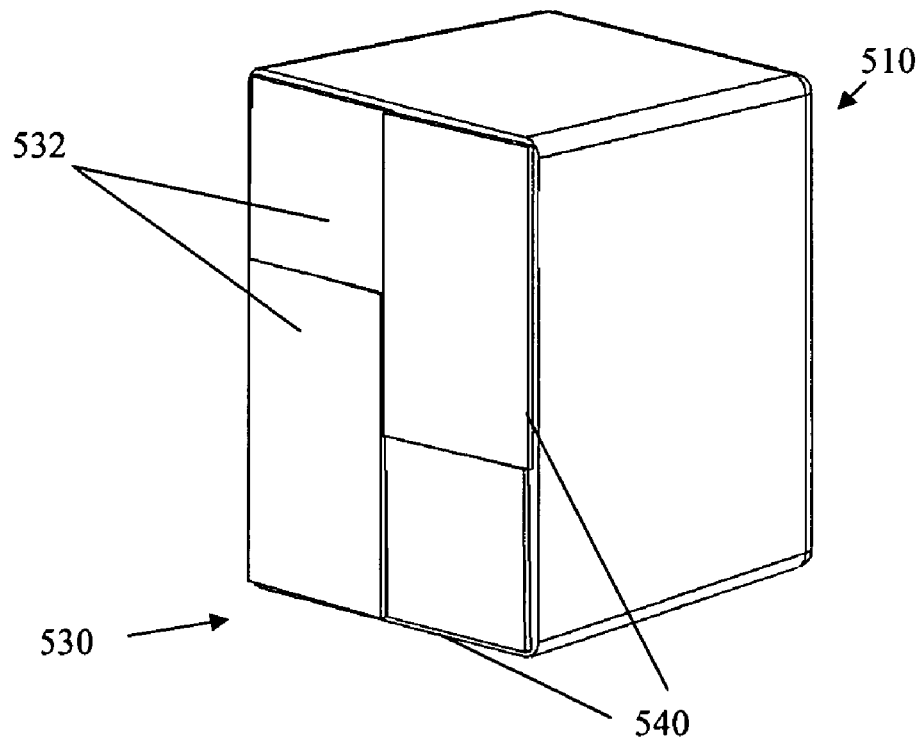
FIG. 11 is a front perspective view of the embodiment of FIG. 10 in a closed configuration.
Figure 12:
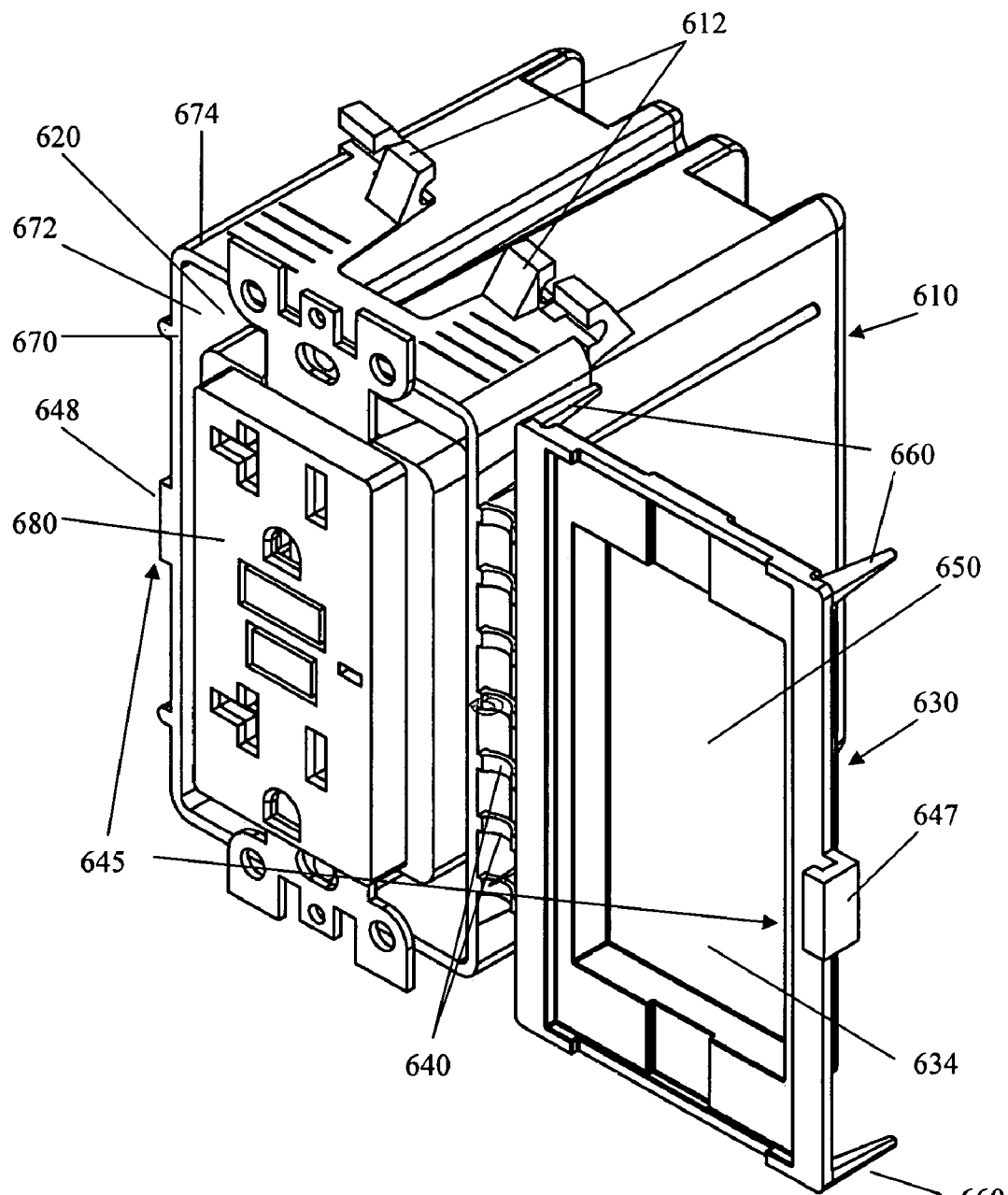
FIG. 12 is a front perspective view of another embodiment of an electrical device mounting box assembly in an open configuration with an electrical device therein.
Figure 13:
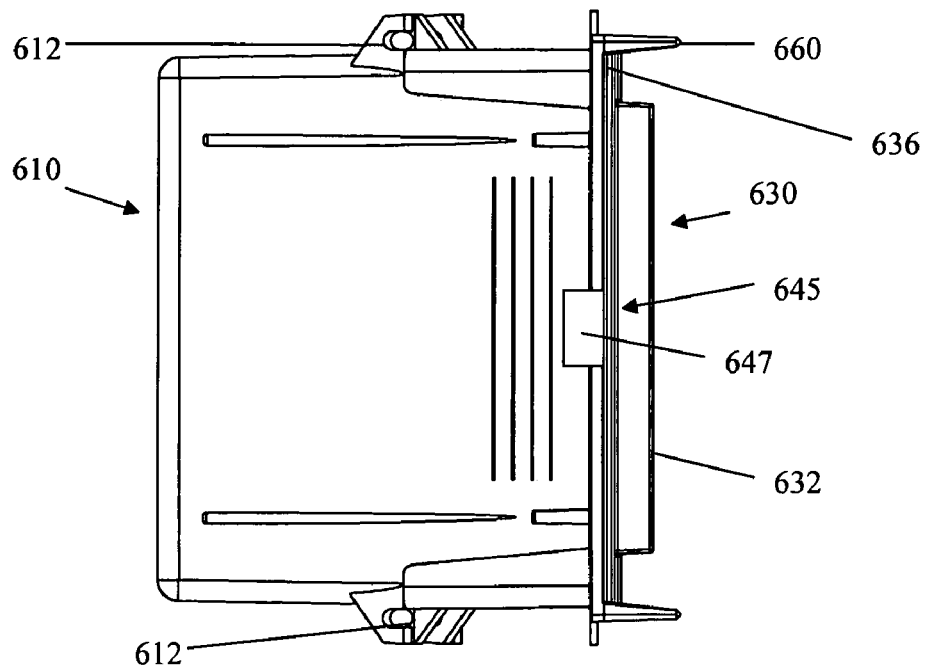
FIG. 13 is a side view of the embodiment of FIG. 12 in a closed configuration.
Figure 14:
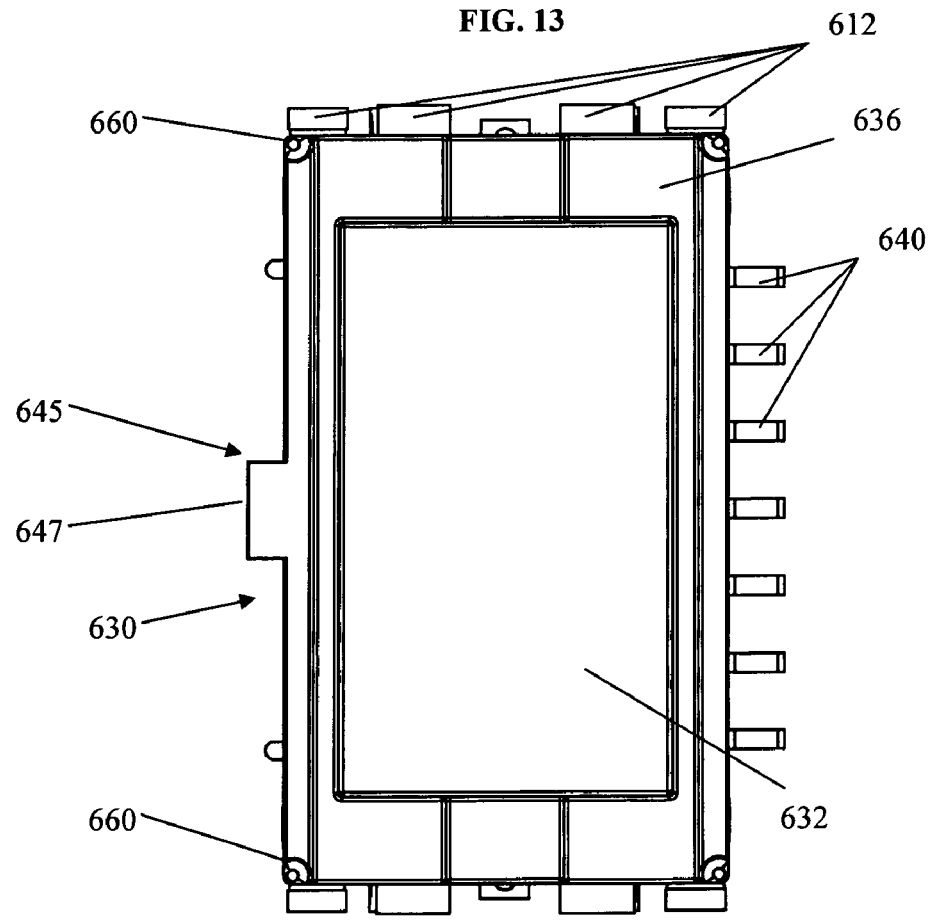
FIG. 14 is a front view of the embodiment of FIG. 12 in a closed configuration.

FIGS. 10-11 illustrate a fifth implementation of an electrical device mounting box assembly. This implementation is similar to the implementation in FIG. 6 except that the removable mud cover 530 is parsed into four segments such that they each fold towards the center of the front opening 520, each on its own living hinge 540, in order to form a closure, as depicted in FIG. 11. As can be seen, in this implementation each of the four sides of the front opening 520 comprises a living hinge 540. The electrical device mounting box 510, mounting elements 512, front side 532, and rear side 534 are similar to those of aforementioned implementations.

FIGS. 12-16 representatively illustrate a sixth implementation of an electrical device mounting box assembly. This implementation is similar to the implementation in FIGS. 1-3 except that in this implementation the removable mud cover 630 further comprises a narrow imprinter 660 extending outward from a front face 636 of the removable mud cover 630, the narrow imprinter 660 configured to form an impression on drywall when drywall is pressed against the narrow imprinter 660. The mounting elements 612, electrical device mounting box 610, cavity 650, latch 645, first latch member 647, second latch member 648, rear side 634, front side 632, living hinge 640, front edge 670, inner wall surface 672, outer wall surface 674, front opening 620, front face 636, and electrical device 680 are similar to the corresponding components described above with respect to the implementation in FIGS. 1-3.

The narrow imprinter 660 depicted in the implementation of FIGS. 12-16 has a rod-like or tapered rod-like shape. The narrow imprinter 660 could comprise a different shape as it is only important that the narrow imprinter 660 extend beyond the front surface of the removable mud cover 630 and that the narrow imprinter 660 have enough strength to dent the surface of drywall pressed against it. The narrow imprinter may be configured to extend a substantial distance out from the front face 636 of the removable mud cover 630 or just a short distance. The narrow imprinter may be configured to extend out from the front face 636 a distance equal to or more than the thickness of the removable mud cover 630 along the same direction as the length of the narrow imprinter 660. The narrow imprinter may also be configured to extend out from the front face 636 a distance equal to or more than twice, three times, four times, five times, six times, seven times, or eight times the thickness of the removable mud cover 630 along the same direction as the length of the narrow imprinter 660.

The narrow imprinter 660 may be configured to make a physical impression including any type and size of impression, such as circular, pinpoint, x-shaped, linear, square, and so forth. The impressions are intended to make it easier for a drywall or other wall installer to know where to cut the wall material in order to allow the electrical device mounting box assembly to later be accessible through the cut wall board. The impressions, accordingly, make known to the installer where the electrical device mounting box assembly will be located with respect to the wall board. In the embodiment illustrated in FIGS. 12-16 the removable mud cover 630 comprises four narrow imprinters 660, at or near boundaries of the removable mud cover 630, such as one on each corner of the removable mud cover 630. This makes it easy for a user to simply cut between the imprinted corners, or slightly outside the imprinted corners, on a piece of imprinted drywall to make the electrical device mounting box assembly later accessible once the drywall is mounted. This obviates the need a user would otherwise have to guess or physically measure to determine where to cut the drywall in order to make the electrical device mounting box assembly accessible through the mounted drywall.

The narrow imprinter 660 in the embodiments of FIGS. 12-16 extends substantially perpendicularly outward from the front face 636. The narrow imprinter could extend out at an angle in various other embodiments, such as offset by 45 degrees or less, 30 degrees or less, 15 degrees or less, and so on, from a truly perpendicular angle with respect to the front face 636. The narrow imprinter 660 may be tapered along its length such that its thickness decreases as the distance from the front face 636 increases. Alternatively, the narrow imprinter 660 may have a substantially similar cross section and/or thickness along its length. The removable mud cover 630 may comprise any number of narrow imprinters 660 in any location. For instance the removable mud cover 630 may comprise 1, 2, 3, 4, 5, 6, 7, 8, or more narrow imprinters 660, which may be located at the corners, sides, top, bottom, and so forth, of the removable mud cover 630.

FIGS. 17-23 representatively illustrate a seventh implementation of an electrical device mounting box assembly. Several of the subcomponents of this implementation are identical or similar to those already described with respect to the above implementations. For instance, electrical device mounting box 710, the mounting elements 712, the cavity 750, the front opening 720 of the electrical device mounting box 710, front edge 770 of the front opening 720, outer wall surface 774 of the electrical device mounting box 710, living hinge 740, removable mud cover 730, narrow imprinters 760, latch 745, first latch member 747, second latch member 748, and electrical device 780 may be, for the most part, the same as corresponding components described above with respect to the implementation in FIGS. 1-3.

Figure 17:
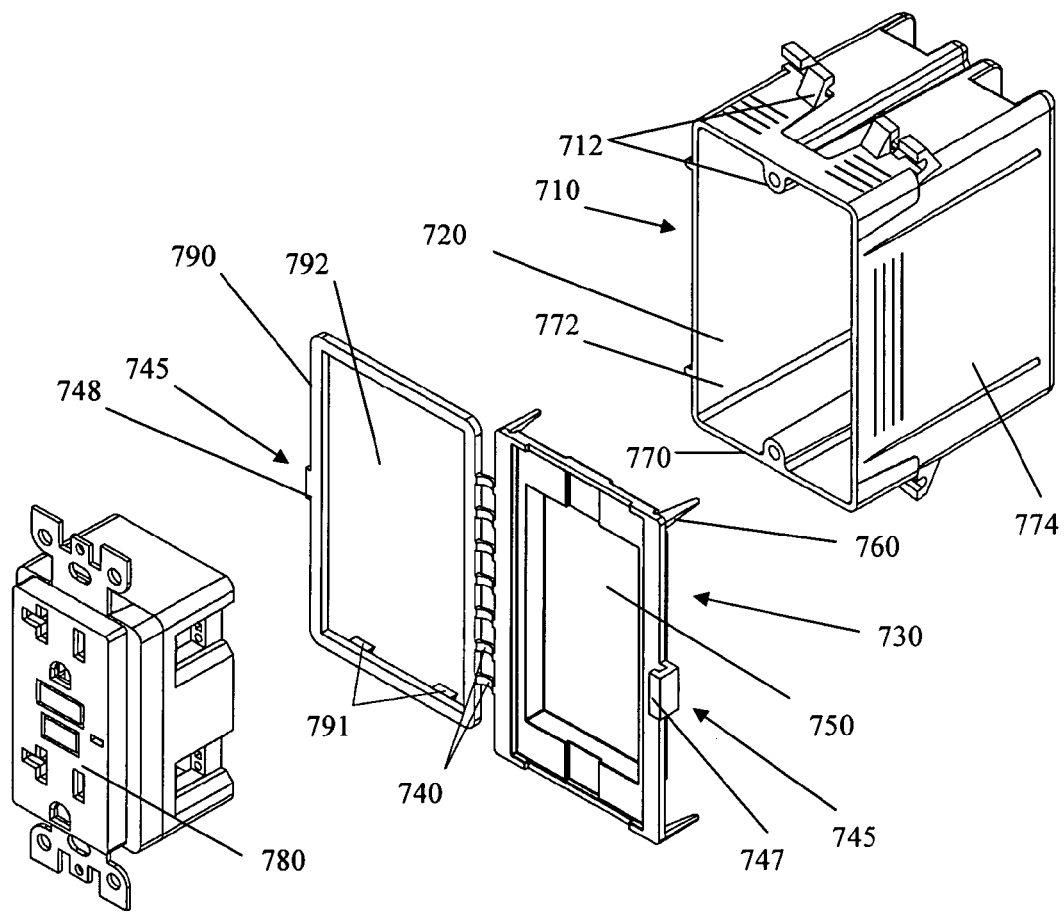
FIG. 17 is a front perspective exploded view of another embodiment of an electrical device mounting box assembly with an electrical device.

Different from the implementation in FIGS. 1-3, the implementations of FIGS. 17-23 involve an attachment member 790, where the living hinge 740, removable mud cover 730, narrow imprinters 760 and first latch member 747 are coupled to the electrical device mounting box 710 through a removable attachment member 790. In the particular implementations shown in FIGS. 17-19, the attachment member 790 is configured as an attachment panel 790 comprising a through hole 792 (FIG. 17). In other particular implementations, the attachment member 790 may be configured as a partial ring extending only to, around or partially around, the mounting element 712 (in the form of the electrical device box mounting screw apertures in FIG. 18), or simply a bar extending along one side of the front opening 720 of the electrical device mounting box 710 through which the living hinge 740 elements couple to the attachment member 790. The attachment member 790 in the particular implementation of FIGS. 17-19 removably seats on the front opening 720 of the electrical device mounting box 710 either in front of (not shown) or behind the yoke of the electrical device 780. When the attachment panel 790 is behind the yoke of the electrical device 780 (see FIGS. 18 and 19), the attachment member 790 is sandwiched between the electrical device 780 and the electrical device mounting box 710. In implementations comprising an attachment member, the removable mud cover 730 is considered to be not only removable, but also detachable from and reattachable to the electrical device mounting box 710.

Figure 18:
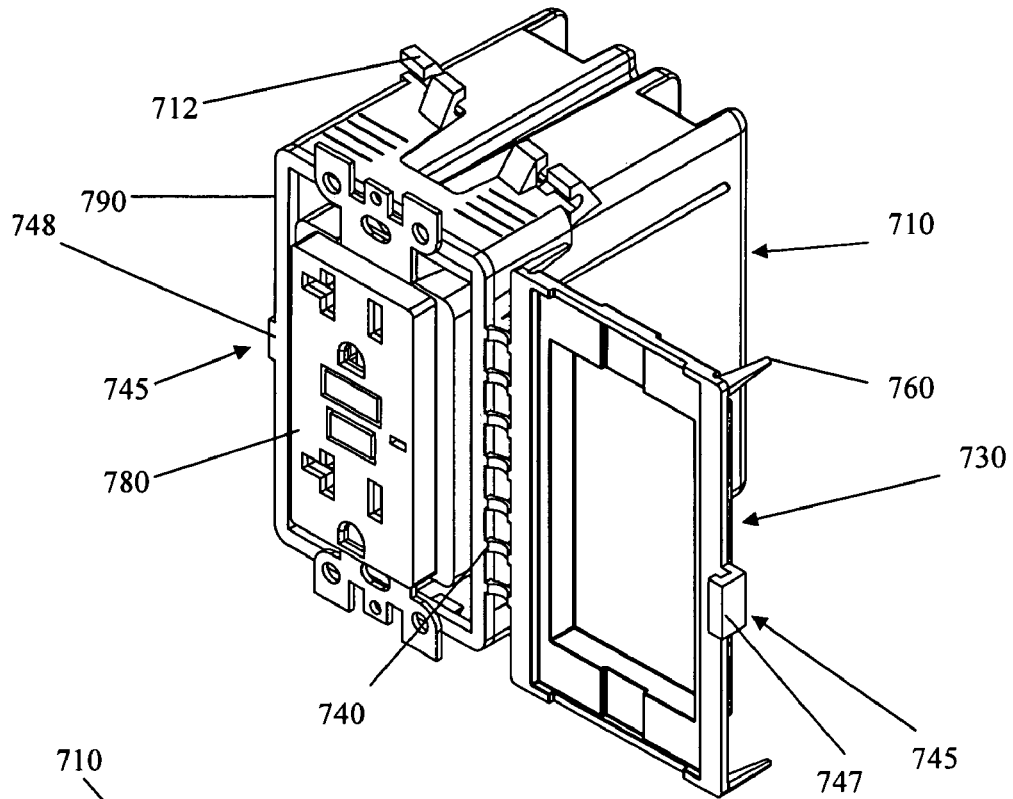
FIG. 18 is the embodiment of FIG. 17 assembled.
Figure 19:
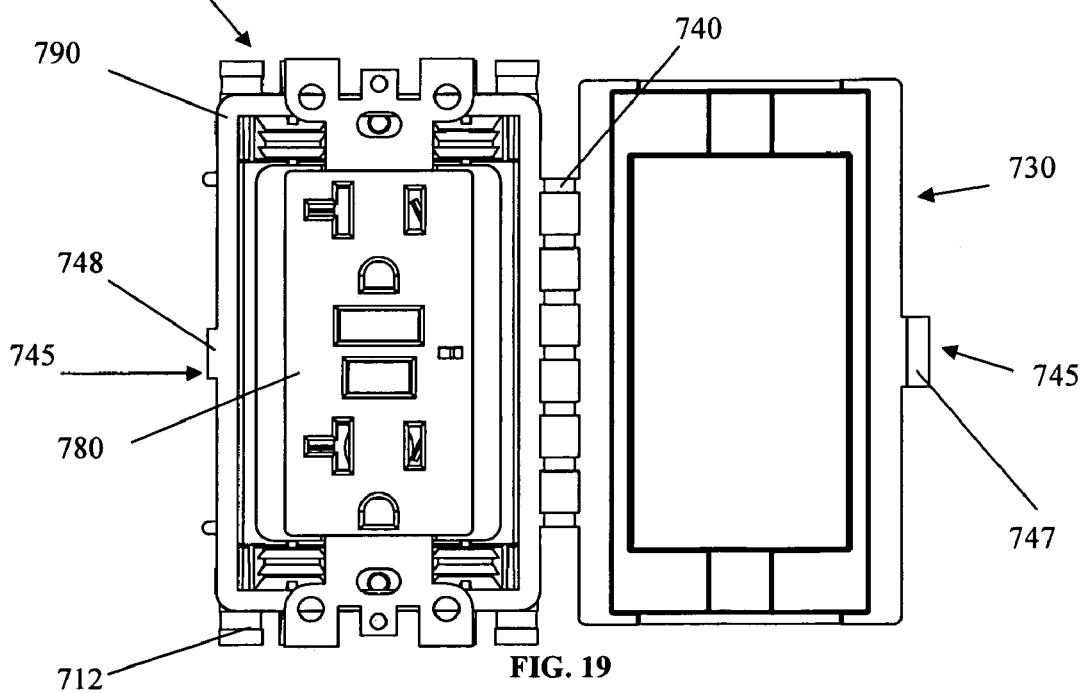
FIG. 19 is a front view of the embodiment of FIG. 18.
Figure 20:
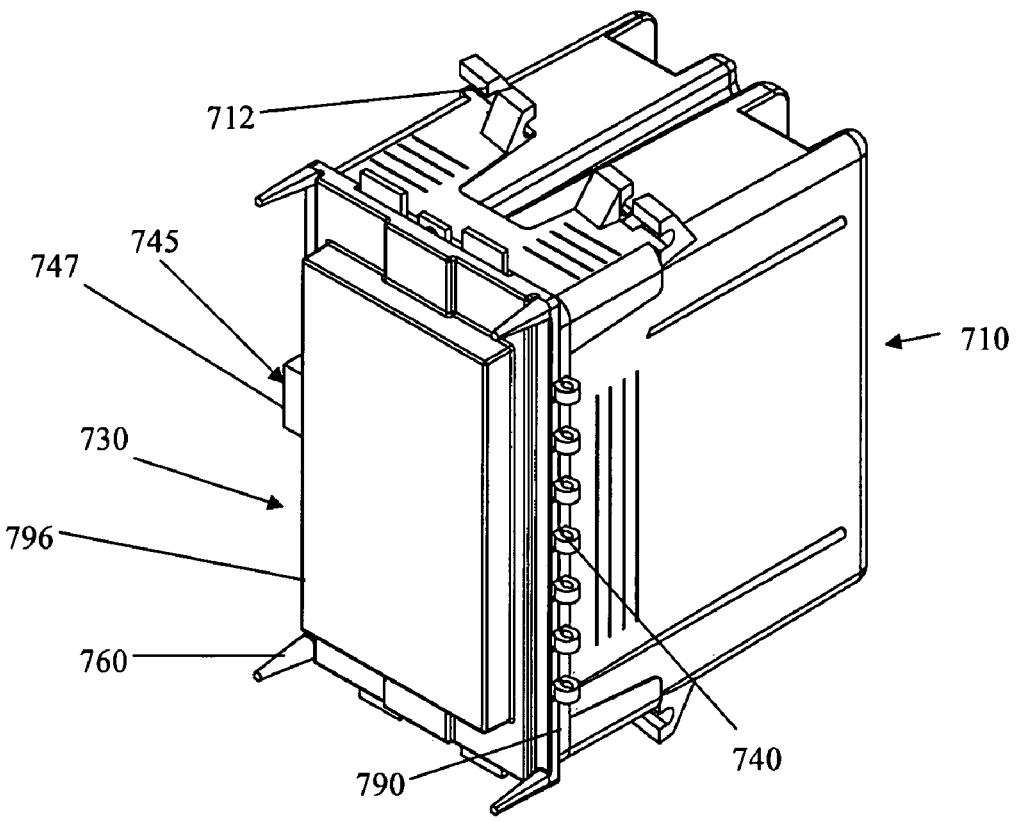
FIG. 20 is the embodiment of FIG. 18 in a closed configuration.
Figure 21:
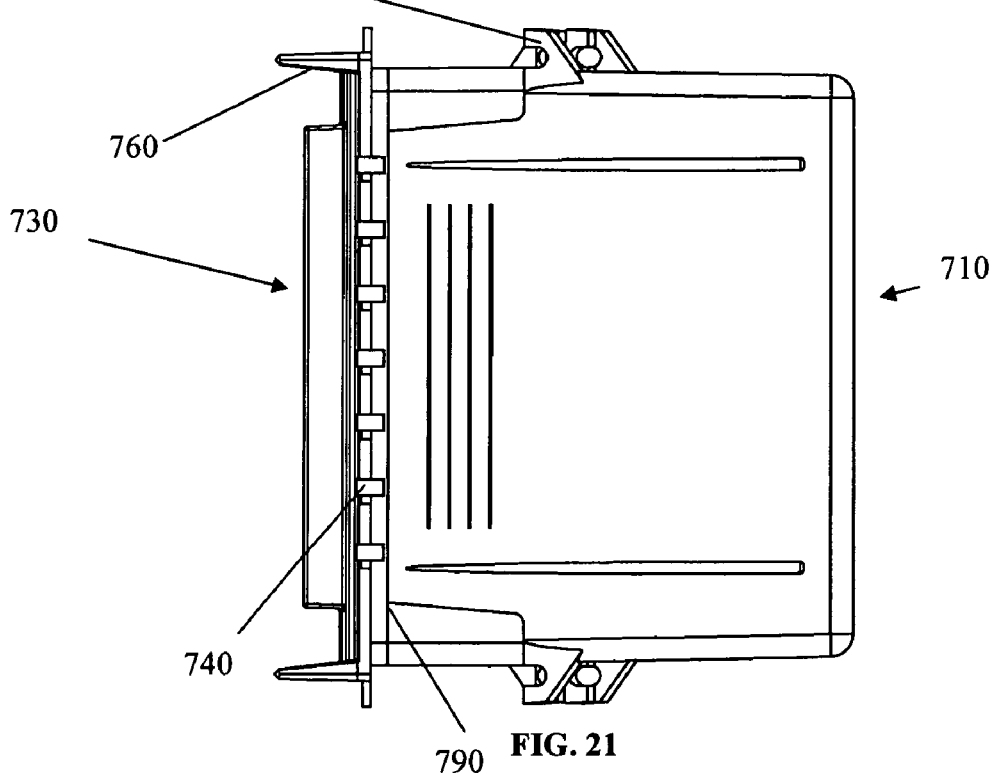
FIG. 21 is a right side view of the embodiment of FIG. 20.
Figure 22:
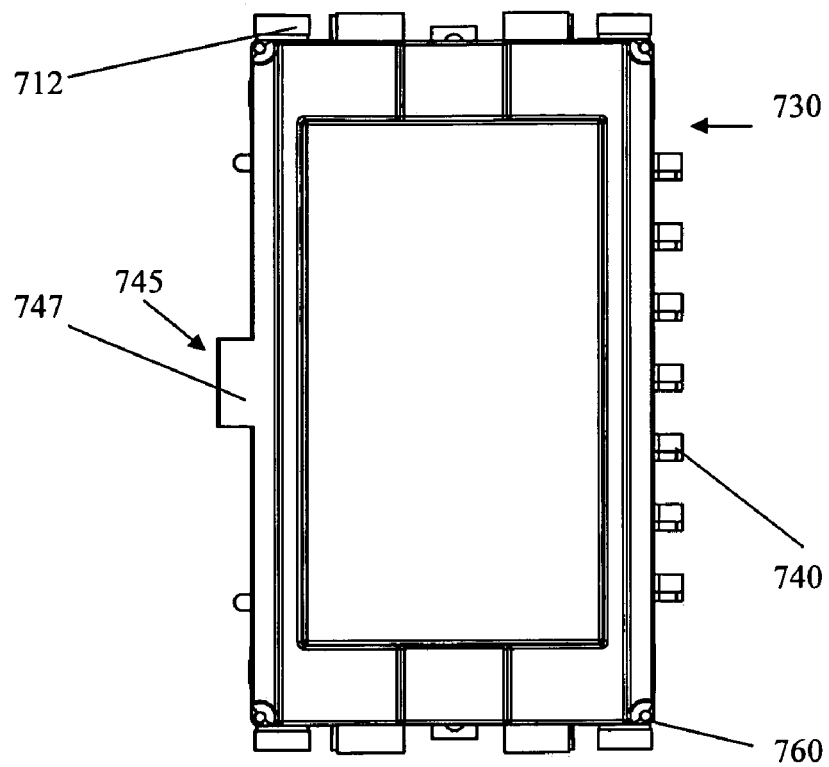
FIG. 22 is a front view of the embodiment of FIG. 20.

In particular implementations, such as that shown in FIGS. 17 and 18, retaining tabs 791 may be included on the attachment member 790 and extend rearward toward the electrical device mounting box 710. In the implementation shown in FIGS. 17 and 18, the retaining clips 791 extend into the inside of the electrical device mounting box 710 and contact the inner wall surface 772 to assist in coupling the removable mud cover 730 to the electrical device mounting box 710 through a friction fit within the front opening 720. However, in other implementations, the retaining clips 791 may extend to the outside surface of the electrical device mounting box 710. Additionally, in particular implementations, the retaining clips 791 may be configured to extend to the inside and to the outside of the front opening 720 of the electrical device mounting box 710 either in direct opposition to another retaining clip 791 (one inside opposing one outside) or spaced from other retaining clips 791. Additional friction elements may be formed on the surface of the retaining clips 791, such as ridges or bulges, to increase the friction resistance between each retaining clip 791 and the surface of the electrical device mounting box 710 that it contacts. With the removable mud cover 730 coupled to the electrical device mounting box 710, the removable mud cover 730 may be removed from the electrical device mounting box 710 in, for example, three ways. First, like with previous implementations, if the living hinge 740 is configured to fatigue at approximately a predetermined number of cycles, the removable mud cover 730 can be worked back and forth in relation to the attachment member 790 until the living hinges fatigue and the removable mud cover 730 breaks off. Second, like with previous implementations, the living hinge 740 may be cut, such as with a utility knife, to remove the removable mud cover 730. Third, the attachment member 790 can be lifted from the front opening 720 of the electrical device mounting box 710.

In one implementation of using the electrical device mounting box assembly of FIGS. 12-16, as illustrated through the various positions of the removable mud cover 630 in those figures, a method of using the electrical device mounting box assembly comprises: installing an electrical device mounting box 610 within a wall such that a front opening 620 of the electrical device mounting box 610 extends into a planar covering on the wall, wherein the electrical device mounting box 610 comprises a removable mud cover 630 coupled via at least one living hinge 640 on at least one side of the front opening 620; closing the removable mud cover 630 from an open position, in which the front opening 620 of the electrical device mounting box 610 is open, to a closed position in which the front opening 620 of the electrical device mounting box 610 is covered by the removable mud cover 630; selectively maintaining the removable mud cover 630 in the closed position through a latch 645; and removing the removable mud cover 630 from the electrical device mounting box 610 by breaking the plurality of living hinges 640.

The step of breaking the plurality of living hinges 640 may comprise fatiguing the plurality of living hinges 640 in less than 30 cycles. The method may further comprise the steps of installing an electrical device 680 within the electrical device mounting box 610 and receiving a face of the electrical device 680 within a cavity 650 in a rear side of the removable mud cover 630 upon closure of the removable mud cover 630. The method may further comprise the step of forming an impression on drywall by pressing the drywall against at least one narrow imprinter 660 extending outward from a front face 636 of the removable mud cover 630. The step of closing the removable mud cover 630 may comprise abutting the removable mud cover 630 against a front edge 670 of the electrical device mounting box 610 without substantially touching the removable mud cover 630 to an inner wall surface 672 of the electrical device mounting box and without substantially touching the removable mud cover to an outer wall surface 672 of the electrical device mounting box 610.

In another implementation of using the electrical device mounting box assembly of FIGS. 12-16, as illustrated through the various positions of the removable mud cover 630 in those figures, a method comprises: installing an electrical device mounting box 610 within a wall such that a front opening 620 of the electrical device mounting box 610 extends into a planar covering on the wall, the electrical device mounting box 610 having an integrally formed removable mud cover 630 coupled to the electrical device mounting box 610; closing the removable mud cover 630 from an open position, in which the front opening 620 of the electrical device mounting box 610 is open, to a closed position in which the front opening 620 of the electrical device mounting box 610 is covered by the removable mud cover 630; selectively maintaining the removable mud cover 630 in the closed position through a latch 645; and forming an impression on a wall material, such as drywall, by pressing the wall material against at least one narrow imprinter 660 extending outward from a front face 636 of the removable mud cover 630.

The step of coupling the removable mud cover 630 to the electrical device mounting box 610 may comprise removably coupling the removable mud cover 630 to the electrical device mounting box 610 via at least one living hinge 640 on at least one side of the front opening 620; and the method may further comprise the step of removing the removable mud cover 630 from the electrical device mounting box 610 by breaking the plurality of living hinges 640. The step of breaking the plurality of living hinges 640 may comprise fatiguing the plurality of living hinges 640 at less than 30 cycles. The method may further comprise the steps of installing an electrical device 680 within the electrical device mounting box 610 and receiving a face of the electrical device 680 within a cavity 650 in a rear side of the removable mud cover 630 upon closure of the removable mud cover 630. The step of closing the removable mud cover 630 may comprise abutting the removable mud cover 630 against a front edge 670 of the electrical device mounting box 610 without substantially touching the removable mud cover 630 to an inner wall surface 672 of the electrical device mounting box 610 and without substantially touching the removable mud cover 630 to an outer wall surface 674 of the electrical device mounting box 610.

In another implementation of using the electrical device mounting box assembly of FIGS. 17-23, as illustrated through the various positions of the removable mud cover 730 in those figures, a method of using a removable mud cover with an electrical device mounting box is like the implementation described with reference to FIGS. 12-16, but the removable mud cover 730 is not integrally formed with the electrical device mounting box 710, and therefore further comprises coupling the removable mud cover 730 to the electrical device mounting box either before or after it is installed in a wall.

Figure 15:
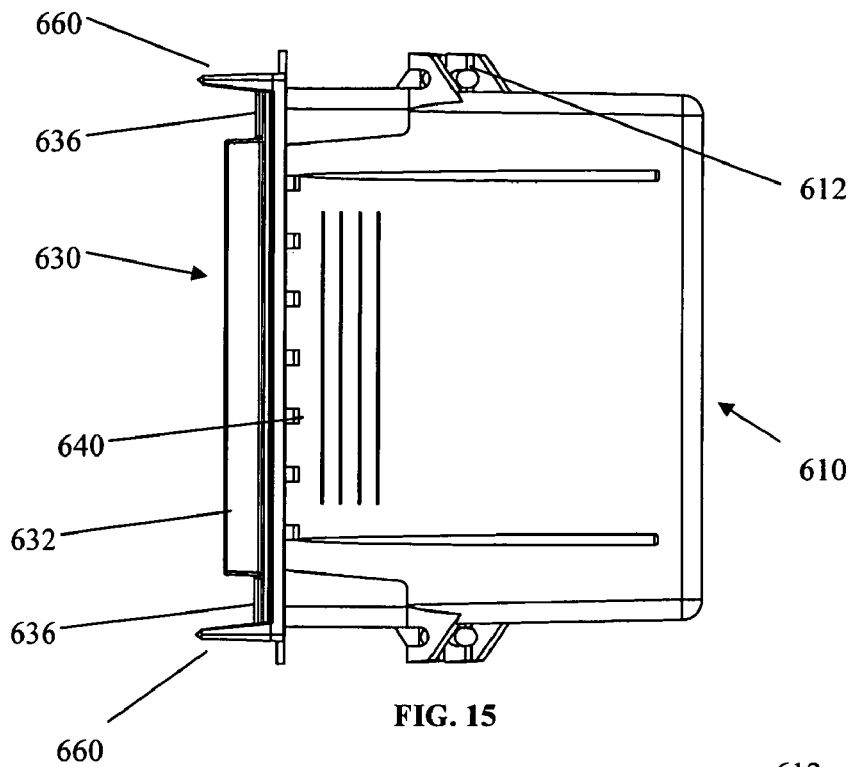
FIG. 15 is a different side view of the embodiment of FIG. 12 in a closed configuration.
Figure 16:
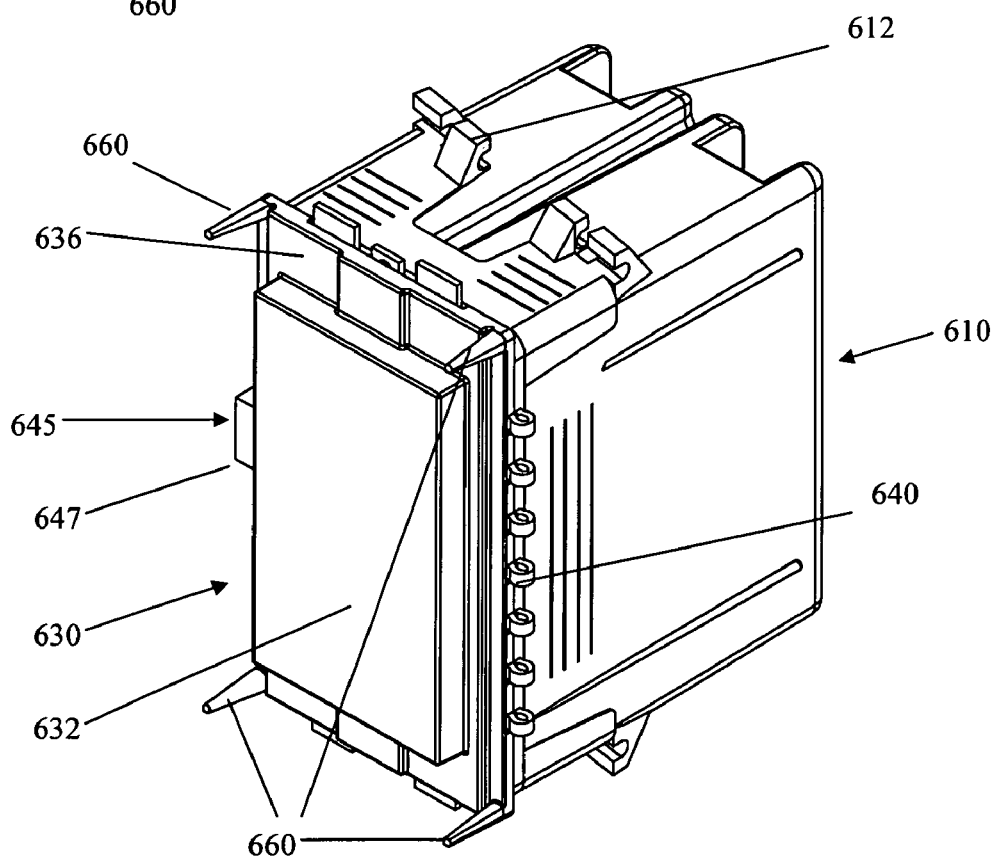
FIG. 16 is a front perspective view of the embodiment of FIG. 12 in a closed configuration.
Figure 23:
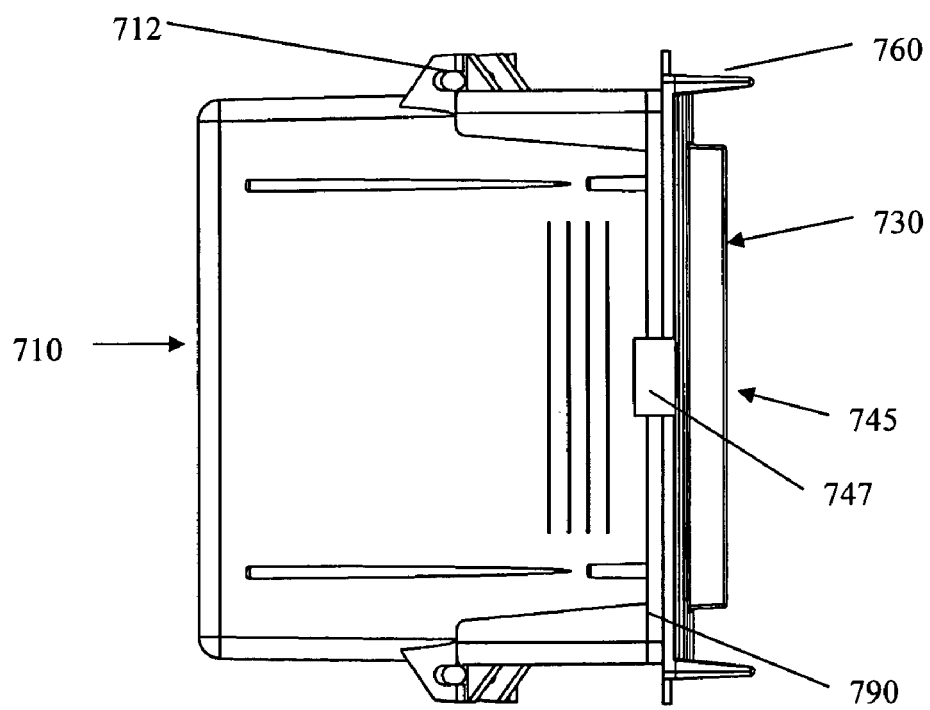
FIG. 23 is a left side view of the embodiment of FIG. 20.

As can be seen from the particular illustrations of FIGS. 15 and 23, because the narrow imprinters 660 or 760 extend beyond the front surface of the removable mud cover 630 or 730 they will contact any surface placed up against the removable mud cover 630 or 730 as explained earlier in this disclosure. If the surface is soft enough, such as drywall or other wall board used in the construction industry to cover both internal and external walls of a building, the narrow imprinters 660 or 760 will make an indentation on the surface of the wall board that the installer can then use to cut an appropriate corresponding hole for the electrical device mounting box without the requirement to exactly measure with a tape measure and calculate the coordinates for the electrical device mounting box on the wall for cutting. This may result in a significant time savings for even skilled installers.

The aforementioned methods described above are not limited to the use of the electrical device mounting box assembly of the figures to which they refer, but may also be used in similar fashion and in varying fashion with any of the other implementations of an electrical device mounting box assembly disclosed in this description.

Figure 24:
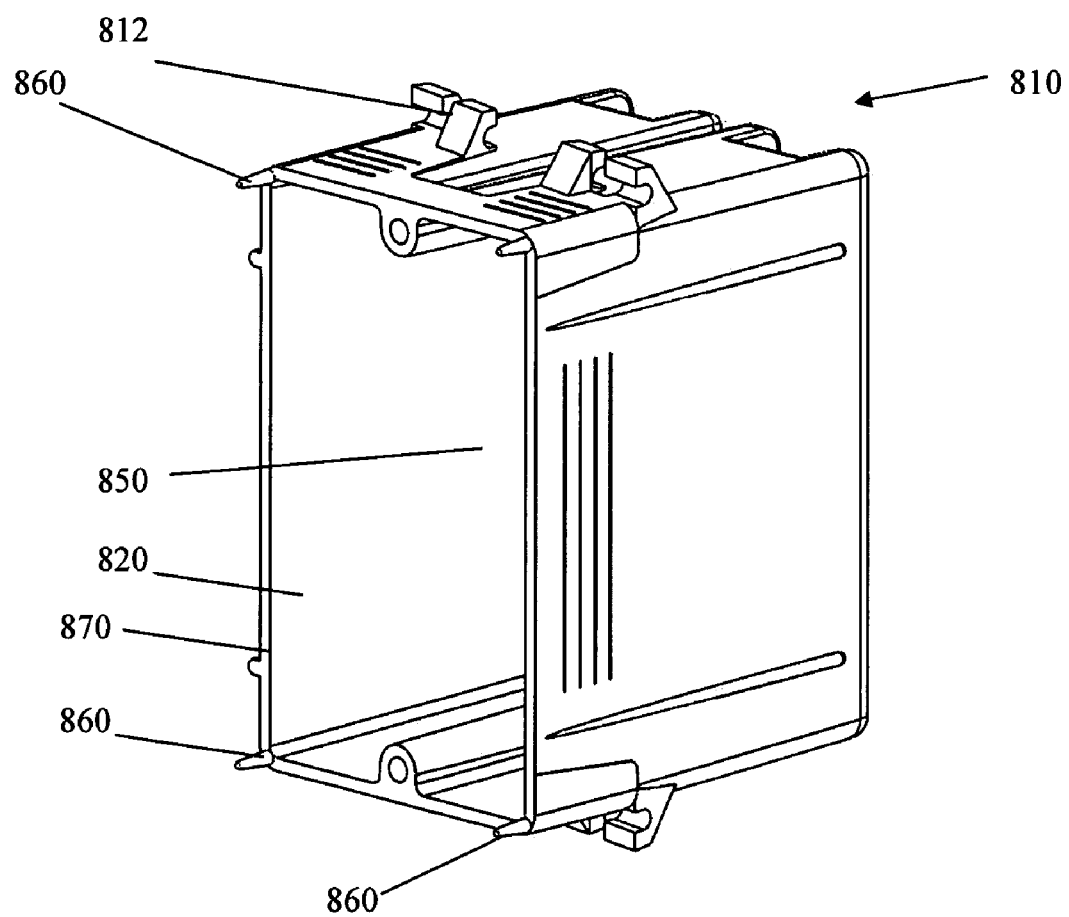
FIG. 24 is a side perspective view of an embodiment of an electrical device mounting box with narrow imprinters at each front corner.

FIG. 24 representatively illustrates an implementation of an electrical device mounting box. Several of the subcomponents of this implementation are identical or similar to those already described with respect to the above implementations. For instance, electrical device mounting box 810, the mounting elements 812, the cavity 850, the front opening 820 of the electrical device mounting box 810, front edge 870 of the front opening 820 may be, for the most part, the same as corresponding components described above with respect to the implementation in FIGS. 1-3.

Different from the implementation in FIGS. 1-3, the implementation of FIG. 24 does not include a mud cover like the previous implementations. However, the electrical device mounting box 810 includes a plurality of narrow imprinters 860 at the front edge 870 boundaries of the electrical device mounting box 810. As illustrated in the implementation shown in FIG. 24, four narrow imprinters 860 extend from the front edge 870 perpendicular to a plane formed by the front opening of the electrical device mounting box 810, one at each corner of the box 810. In other implementations, more or fewer narrow imprinters 860 may be included at any location along the front edge 870, such as along one or more sides of the front edge 870, to indicate a location on the rear side of a drywall or other wall board the location for cutting a hole to expose an electrical device mounting box 810 by pressing the drywall or other wall board material against the front edge 870 of the electrical device mounting box 810 with enough force to cause an indent or plurality of indents to form on the rear side of the wall board material. The installer then need only cut in relation to the marked location rather than the conventional and more difficult process of measuring by hand and drawing the estimated location on the wall board material for cutting.

If the narrow imprinters 860 are short enough (e.g. they do not extend past the front side of the wall board material after the opening has been cut and the wall board material is installed over the electrical device mounting box 810), they will not interfere with later use of the electrical device mounting box 810, electrical device that is installed into the electrical device mounting box 810 or cover that is placed over the box. However, if longer narrow imprinters 860 are used, they can be cut off by an electrical installer using wire cutters when the electrical installer is installing electrical devices in the electrical device mounting box 810 after the wall board material is more permanently coupled to the wall.

The concepts disclosed herein are not limited to the specific implementations shown herein. For example, it is specifically contemplated that the components included in a particular implementation of an electrical device mounting box may be formed of any of many different types of materials or combinations that can readily be formed into shaped objects and that are consistent with the intended operation of an electrical device mounting box assembly. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical device mounting box, electrical device mounting boxes, removable mud covers, openings, living hinges, latches, front sides, rear sides, cavities, narrow imprinters, first latch members, second latch members, front edges, inner wall surfaces, outer wall surfaces, holes, tabs, and any other components forming a particular implementation of an electrical device mounting box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for an electrical device mounting box may be utilized. Accordingly, for example, although boxes, covers, openings, hinges, latches, sides, cavities, imprinters, faces, edges, walls, holes, and tabs may be disclosed, such components may comprise any shape, size, style, type, model, version, class, grade, measurement, concentration, material, weight, quantity, and/or the like consistent with the intended operation of a method and/or system implementation for an electrical device mounting box.

In places where the description above refers to particular implementations of electrical device mounting boxes, it should be readily apparent that a number of modifications may be made without departing from the spirit thereof and that these implementations may be applied to other electrical device mounting boxes. The accompanying claims are intended to cover such modifications as would fall within the true spirit and scope of the disclosure set forth in this document. Likewise, any method steps recited in the above description and in the claims below may be performed in any order and not solely in the order in which the steps are recited. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device mounting box assembly comprising:
    an electrical device mounting box configured for mounting within a wall such that a front opening of the electrical device mounting box extends into a planar covering on the wall; and
    a removable mud cover integrally molded with the electrical device mounting box and attached to the electrical device mounting box through at least one living hinge on at least one side of the front opening, wherein the removable mud cover is configured to be removed after the planar covering is installed on the wall and mud is applied to the planar covering;
    wherein the removable mud cover is selectively moveable between an open position in which the front opening of the electrical device mounting box is open and a closed position in which the front opening of the electrical device mounting box is covered by the removable mud cover.

2. The electrical device mounting box assembly of claim 1, wherein the at least one living hinge comprises a plurality of living hinges on the at least one side of the front opening.

3. The electrical device mounting box assembly of claim 1, wherein the at least one living hinge is configured to undergo fatigue failure at less than 30 cycles.

4. The electrical device mounting box assembly of claim 1, wherein the removable mud cover is configured to remain in its closed position through a latch.

5. The electrical device mounting box assembly of claim 1, wherein the removable mud cover when moved to its closed position is configured to remain in its closed position through a latch comprising one of a first ridge and a first bulge on at least one side of the removable mud cover and one of a second ridge and a second bulge on a corresponding inner wall surface of the electrical device mounting box.

6. The electrical device mounting box assembly of claim 1, the removable mud cover comprising a front side and a rear side, the rear side facing the front opening of the electrical device mounting box when the removable mud cover is in its closed position, the rear side comprising a cavity sized to receive a face of an electrical device mounted in the electrical device mounting box when the removable mud cover is in its closed position.

7. The electrical device mounting box assembly of claim 1, wherein the removable mud cover further comprises a narrow imprinter extending outward from a front face of the removable mud cover, the narrow imprinter configured to form an impression on drywall when drywall is pressed against the narrow imprinter.

8. The electrical device mounting box assembly of claim 1, wherein the removable mud cover when moved to its closed position is configured to remain in its closed position through a latch comprising a first latch member on an outer side of the electrical device mounting box and a second latch member on a corresponding side of the removable mud cover, the first and second latch members being configured to latch together upon closure of the removable mud cover.

9. The electrical device mounting box assembly of claim 1, wherein the removable mud cover is further configured such that in a closed position it abuts against a front edge of the front opening of the electrical device mounting box but does not substantially touch an inner wall surface of the electrical device mounting box and does not substantially touch an outer wall surface of the electrical device mounting box.

10. The electrical device mounting box assembly of claim 1, wherein the at least one living hinge is configured to fatigue upon reaching approximately a predetermined number of cycles of fully opening and closing the removable mud cover in relation to the electrical device mounting box.

11. A removable mud cover for insertion into an opening of an electrical device mounting box configured to mount within a wall such that a front opening of the electrical device mounting box extends into a planar covering on the wall, the removable mud cover integrally molded with the electrical device mounting box and attached to the electrical device mounting box through at least one living hinge on at least one side of the front opening, the removable mud cover configured to be removed after the planar covering is installed on the wall and mud is applied to the planar covering and further comprising a plurality of narrow imprinters, one at each of a plurality of boundaries of the removable mud cover, the plurality of narrow imprinters each extending outward from a front face of the removable mud cover, the narrow imprinters configured to form a plurality of impressions on drywall to identify the plurality of boundaries of the removable mud cover when drywall is pressed against the narrow imprinters.

12. The electrical device mounting box assembly of claim 11, further comprising a latch comprising one of a ridge and a bulge on at least one side of the removable mud cover.

13. The electrical device mounting box assembly of claim 11, the removable mud cover comprising a front side and a rear side, the rear side facing the front opening of the electrical device mounting box when the removable mud cover is in its closed position, the rear side comprising a cavity sized to receive a face of an electrical device mounted in the electrical device mounting box.

14. The electrical device mounting box assembly of claim 11, wherein the removable mud cover is further configured such that in a closed position it abuts against a front edge of the front opening of the electrical device mounting box but does not substantially touch an inner wall surface of the electrical device mounting box and does not substantially touch an outer wall surface of the electrical device mounting box.

15. The electrical device mounting box assembly of claim 11, wherein at least a portion of the plurality of narrow imprinters comprises a plurality of narrow imprinters located at or near the corners of the removable mud cover and extending substantially perpendicularly outward from the removable mud cover.

16. The electrical device mounting box assembly of claim 11, wherein the at least one living hinge is configured to fatigue upon reaching approximately a predetermined number of cycles of fully opening and closing the removable mud cover in relation to the electrical device mounting box.

17. A method of using an electrical device mounting box assembly, comprising:
installing an electrical device mounting box within a wall such that a front opening of the electrical device mounting box extends into a planar covering on the wall, the removable mud cover being integrally molded with the electrical device mounting box and attached to the electrical device mounting box through at least one living hinge on at least one side of the front opening, wherein the electrical device mounting box is configured to be removed after the planar covering is installed on the wall and mud is applied to the planar covering;
closing the removable mud cover from an open position, in which the front opening of the electrical device mounting box is open, to a closed position in which the front opening of the electrical device mounting box is covered by the removable mud cover;
selectively maintaining the removable mud cover in the closed position through a latch; and
removing the removable mud cover from the electrical device mounting box by breaking the at least one of living hinge to permanently remove the removable mud cover from attachment to the electrical device mounting box.

18. The method of claim 17, wherein the step of breaking the at least one living hinge comprises fatiguing the at least one living hinge in less than 30 cycles.

19. The method of claim 17, further comprising the step of forming an impression on drywall by pressing the drywall against at least one narrow imprinter extending outward from a front face of the removable mud cover.

20. The method of claim 17, wherein the step of breaking the at least one living hinge comprises fatiguing the at least one living hinge upon reaching approximately a predetermined number of cycles of opening and closing the removable mud cover.

21. A method of using an electrical device mounting box assembly, comprising:
installing an electrical device mounting box within a wall such that a front opening of the electrical device mounting box extends into a planar covering on the wall, the electrical device mounting box integrally molded with the electrical device mounting box and attached to the electrical device mounting box through at least one living hinge on at least one side of the front opening, the electrical device mounting box configured to be removed after the planar covering is installed on the wall and mud is applied to the planar covering;
closing the removable mud cover from an open position, in which the front opening of the electrical device mounting box is open, to a closed position in which the front opening of the electrical device mounting box is covered by the removable mud cover;
identifying a plurality of locations on a back side of a drywall to be installed around the electrical device mounting box for where boundaries of the electrical device mounting box opening should be cut by forming a plurality of impressions on the back side of the drywall by pressing the back side of the drywall against a plurality of narrow imprinters extending outward from boundaries of a front face of the removable mud cover; and
permanently removing the removable mud cover from attachment to the electrical device mounting box by breaking the at least one living hinge.

22. The method of claim 21, wherein permanently removing the removable mud cover from attachment to the electrical device comprises fatiguing the living hinge upon reaching approximately a predetermined number of cycles of opening and closing the removable mud cover.

* * * * *